United States Patent
Zeng

(10) Patent No.: US 10,575,163 B2
(45) Date of Patent: Feb. 25, 2020

(54) COMMUNICATION METHOD, USER EQUIPMENT, ACCESS NETWORK DEVICE, AND APPLICATION SERVER

(71) Applicant: Huawei Technologies Co., Ltd., Shenzhen, Guangdong (CN)

(72) Inventor: Qinghai Zeng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 280 days.

(21) Appl. No.: 15/429,699

(22) Filed: Feb. 10, 2017

(65) Prior Publication Data

US 2017/0156048 A1 Jun. 1, 2017

Related U.S. Application Data

(63) Continuation of application No. PCT/CN2014/084105, filed on Aug. 11, 2014.

(51) Int. Cl.
| | |
|---|---|
| *H04L 12/26* | (2006.01) |
| *H04W 8/02* | (2009.01) |
| *H04W 8/18* | (2009.01) |
| *H04W 8/20* | (2009.01) |
| *H04W 8/24* | (2009.01) |

(52) U.S. Cl.
CPC .............. *H04W 8/02* (2013.01); *H04W 8/183* (2013.01); *H04W 8/20* (2013.01); *H04W 8/24* (2013.01)

(58) Field of Classification Search
CPC ....................................................... H04W 8/02
See application file for complete search history.

(56) References Cited

U.S. PATENT DOCUMENTS

| 7,675,858 B2 * | 3/2010 | Dekeyzer ............ H04L 12/2856 370/236 |
| 7,983,218 B2 * | 7/2011 | Kesavan ............. H04L 65/1006 370/331 |

(Continued)

FOREIGN PATENT DOCUMENTS

| CN | 1794871 A | 6/2006 |
| CN | 1868170 A | 11/2006 |

(Continued)

*Primary Examiner* — Guang W Li
(74) *Attorney, Agent, or Firm* — Womble Bond Dickinson (US) LLP

(57) ABSTRACT

A communication method, user equipment, an access network device, and an application server. The method is: allocating, by the access network device, an IP address to the UE; and after the UE notifies the IP address to the application server, performing, by the application server, a data transmission service for the UE by using the IP address. By using the technical solutions of the present invention, a PDN-GW, an SGW, a PCRF entity, an MME, and an HSS in an existing wireless communications network are deleted, and functions of the foregoing network side devices are implemented by using the access network device and the application server. Therefore, it is avoided that an SGW-to-PDN-GW link becomes a bottleneck of a processing capability of the wireless communications network, network layers are greatly reduced, a data transmission delay is effectively reduced, and a network paralysis risk is reduced.

13 Claims, 21 Drawing Sheets

(56) References Cited

U.S. PATENT DOCUMENTS

| | | | | |
|---|---|---|---|---|
| 8,155,078 B2 * | 4/2012 | Ahmavaara | ............. | H04W 8/02 370/331 |
| 8,913,585 B2 * | 12/2014 | Kunniyur | ............ | H04L 65/1016 370/331 |
| 8,976,807 B2 * | 3/2015 | Asati | ................... | H04L 61/1511 370/464 |
| 9,451,643 B2 * | 9/2016 | John | ..................... | H04W 76/10 |
| 9,473,971 B2 * | 10/2016 | Kim | ........................ | H04W 4/70 |
| 2005/0117556 A1 * | 6/2005 | Lee | .................. | H04L 29/06027 370/338 |
| 2008/0059582 A1 * | 3/2008 | Hartikainen | ............ | H04L 67/14 709/204 |
| 2009/0141671 A1 * | 6/2009 | Miyagi | ................ | H04W 8/183 370/328 |
| 2009/0170557 A1 * | 7/2009 | Chauhan | ............... | H04W 36/14 455/552.1 |
| 2010/0254313 A1 * | 10/2010 | Hallenstal | ......... | H04L 29/12311 370/328 |
| 2011/0185011 A1 * | 7/2011 | Shuman | .................. | H04W 8/24 709/203 |
| 2012/0093145 A1 * | 4/2012 | Anchan | ................. | H04W 28/24 370/352 |
| 2012/0179790 A1 * | 7/2012 | Kim | ........................ | H04W 8/26 709/220 |
| 2012/0207137 A1 * | 8/2012 | Zhou | ...................... | H04L 41/12 370/331 |
| 2012/0269162 A1 * | 10/2012 | Vesterinen | ............ | H04W 8/082 370/331 |
| 2014/0050320 A1 * | 2/2014 | Choyi | .................... | H04L 63/08 380/270 |
| 2015/0106454 A1 * | 4/2015 | Lim | ........................ | H04W 8/02 709/206 |
| 2015/0296321 A1 * | 10/2015 | Kim | ........................ | H04W 8/02 370/329 |
| 2017/0019750 A1 * | 1/2017 | Palanisamy | ....... | H04W 28/0289 |

FOREIGN PATENT DOCUMENTS

| | | |
|---|---|---|
| CN | 101569216 A | 10/2009 |
| CN | 101699810 A | 4/2010 |
| EP | 1942694 A1 | 7/2008 |
| EP | 2667665 A1 | 11/2013 |

* cited by examiner

| ACK_SN | NACK_SN quantity | | | |
|---|---|---|---|---|
| NACK_SN#1 | Quantity of fountain code received from a link 1 | Quantity of fountain code received from a link 2 | ... | Quantity of fountain code received from a link n |
| NACK_SN#2 | Quantity of fountain code received from a link 1 | Quantity of fountain code received from a link 2 | ... | Quantity of fountain code received from a link n |
| ... | | | | |
| NACK_SN#m | Quantity of fountain code received from a link 1 | Quantity of fountain code received from a link 2 | ... | Quantity of fountain code received from a link n |

FIG. 19

COMMUNICATION METHOD, USER EQUIPMENT, ACCESS NETWORK DEVICE, AND APPLICATION SERVER

CROSS-REFERENCE TO RELATED APPLICATIONS

This application is a continuation of International Application No. PCT/CN2014/084105, filed on Aug. 11, 2014, the disclosure of which is hereby incorporated by reference in its entirety.

TECHNICAL FIELD

The present invention relates to the communications technology field, and in particular, to a communication method, user equipment, an access network device, and an application server.

BACKGROUND

With rapid development of communications technologies, a wireless communications technology is widely applied because of advantages such as convenient and quick information transmission and a low cost.

Currently, referring to FIG. 1, a wireless communications network includes user equipment (User Equipment, UE) and a network side device. The UE performs a data service with a network side by using an IP address allocated on the network side to the UE. In the wireless communications network, the network side device includes a packet data network gateway (Packet Data Network Gateway, PDN-GW), a serving gateway (Serving Gateway, SGW), and an evolved node (Evolved Node, eNB). One PDN-GW is superior and connected to multiple SGWs, one SGW is superior and is connected to multiple eNBs, and one eNB serves multiple UEs, so as to form a tree structure (as shown in FIG. 2) that uses the PDN-GW as a root. In addition, to ensure quality of service (Quality of Service, QoS) and implement quality of a differentiated service, and also ensure service continuity and call accessibility when UE is moved, the network side device further includes a mobility management entity (Mobile Management Entity, MME), a policy and charging rules function (Policy and Charging Rule Function, PCRF) entity, and a home subscriber server (Home Subscriber Server, HSS). The MME is configured to control mobility of UE, including service continuity of UE in a radio resource control (Radio Resource Control, RRC) connected state in a moving process and incoming call accessibility of UE in an idle state. The PCRF entity is configured between devices such as the PDN-GW and the eNB to ensure QoS and implement quality of a differentiated service by means of bearer management and resource scheduling management.

It can be learned from a tree structure shown in FIG. 2 that all UEs in the wireless communications network perform a data service by using the following path: UE-eNB-SGW-PDN GW. In a wireless communications network architecture with such a tree structure, a large amount of data aggregates on an SGW-to-PDN-GW link. Consequently, when a network is busy, the SGW-to-PDN-GW link becomes backhaul load and a bottleneck of a processing capability of the wireless communications network. In addition, a hierarchical network architecture of the wireless communications network enlarges a data transmission delay. There is further a risk of paralysis of an entire network caused by a PDN-GW data processing error. Therefore, currently, the wireless communications network cannot meet a requirement of mobile bandwidth for large bandwidth and a low delay.

In conclusion, there are problems of a large data transmission delay and a high risk of network paralysis for the current wireless communications network.

SUMMARY

Embodiments of the present invention provide a communication method, user equipment, an access network device, and application server, so as to resolve problems of a large data transmission delay and a high risk of network paralysis for a current wireless communications network.

According to a first aspect, user equipment is provided, including: an obtaining unit, configured to obtain an Internet Protocol IP address that is allocated by an access network device to the user equipment; and a transceiver unit, configured to: notify the IP address obtained by the obtaining unit to an application server, and receive a data transmission service provided by the application server by using the IP address, where the application server is a server configured to manage mobility of a terminal and service quality.

With reference to the first aspect, in a first possible implementation manner, the transceiver unit is further configured to: when notifying the IP address to the application server, notify a user identity to the application server, so that the application server verifies, according to the user identity, whether a user is valid.

With reference to the first aspect, in a second possible implementation manner, the user equipment further includes: an access unit, configured to: after accessing an access network corresponding to the access network device, if it is detected, according to a preset rule, that at least one other accessible access network is available, request to access the at least one other access network, where the other access network is a cellular network or a non-cellular network.

With reference to the second possible implementation manner of the first aspect, in a third possible implementation manner, the obtaining unit is further configured to: after the at least one other access network is accessed, obtain an IP address corresponding to the at least one other access network.

With reference to the third possible implementation manner of the first aspect, in a fourth possible implementation manner, the transceiver unit is further configured to notify the IP address corresponding to the at least one other access network to the application server.

With reference to the fourth possible implementation manner of the first aspect, in a fifth possible implementation manner, the user equipment further includes: a disconnection unit, configured to: when the user equipment determines that any IP address is in a no-longer-being-used state, disconnect from an access network corresponding to the IP address.

With reference to the fifth possible implementation manner of the first aspect, in a sixth possible implementation manner, the transceiver unit is further configured to notify, to the application server, the IP address and information about disconnecting from the access network corresponding to the IP address, so that the application server no longer uses the IP address to provide a data transmission service for the user equipment.

With reference to the fifth possible implementation manner or the sixth possible implementation manner of the first aspect, in a seventh possible implementation manner, the transceiver unit is further configured to: after the user equipment disconnects from all access networks corresponding to the user equipment, receive a tracking area identity broadcast by an access network device in at least one access network, and notify the received tracking area identity to the application server, so that the application server determines corresponding one or more access network device identities according to the tracking area identity when the user equipment is paged.

With reference to the third possible implementation manner to the seventh possible implementation manner of the first aspect, in an eighth possible implementation manner, the transceiver unit is specifically configured to: when there are at least two IP addresses corresponding to the user equipment, receive the data transmission service provided by the application server by separately using the at least two IP addresses.

With reference to the eighth possible implementation manner of the first aspect, in a ninth possible implementation manner, when the data transmission service is a downlink data transmission service, the transceiver unit is specifically configured to receive downlink data that is sent by the application server by using the at least two IP addresses as different destination IP addresses respectively.

With reference to the ninth possible implementation manner of the first aspect, in a tenth possible implementation manner, the transceiver unit is further configured to: send the downlink data of the different destination IP addresses to different IP/User Datagram Protocol UDP entities in the user equipment respectively, where one IP/UDP entity is corresponding to one destination IP address; aggregate, at a Multipath Transmission Control Protocol MPTCP entity in the user equipment, the downlink data respectively processed by the IP/UDP entities; and when a preset condition of the user equipment is met, control the MPTCP entity to generate first reception success acknowledgement information, and send the first reception success acknowledgement information to the application server.

With reference to the tenth possible implementation manner of the first aspect, in an eleventh possible implementation manner, the transceiver unit is specifically configured to aggregate, at the MPTCP entity in the user equipment, fountain coding data blocks processed by the IP/UDP entities.

With reference to the eleventh possible implementation manner of the first aspect, in a twelfth possible implementation manner, the transceiver unit is further configured to: when it is determined that one or more fountain coding source data blocks are successfully obtained by means of decoding, generate a first MPTCP status report and send the first MPTCP status report to the application server; or send a generated first MPTCP status report to the application server according to a preset period, where the first MPTCP status report includes an identity of one or more fountain coding source data blocks and information about whether reception is successful, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the eighth possible implementation manner of the first aspect, in a thirteenth possible implementation manner, when the data transmission service is an uplink data transmission service, the transceiver unit is specifically configured to: send the uplink data to an MPTCP entity in the user equipment for processing; control the MPTCP entity to send processed uplink data to different UDP/IP entities respectively for processing; control the different UDP/IP entities to send processed uplink data to the application server by respectively using access networks corresponding to the at least two IP addresses; and receive second reception success acknowledgement information sent by an MPTCP entity in the application server.

With reference to the thirteenth possible implementation manner of the first aspect, in a fourteenth possible implementation manner, the uplink data that is sent by the transceiver unit to the different UDP/IP entities for processing is fountain coding data blocks.

With reference to the fourteenth possible implementation manner of the first aspect, in a fifteenth possible implementation manner, the transceiver unit is specifically configured to receive a second MPTCP status report sent by the MPTCP entity in the application server, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the eleventh possible implementation manner to the twelfth possible implementation manner, and the fourteenth possible implementation manner to the fifteenth possible implementation manner of the first aspect, in a sixteenth possible implementation manner, the transceiver unit is further configured to: before the fountain coding data block is transmitted, send fountain coding capability supportive information of the user equipment to the application server, and receive a fountain code coding/decoding related configuration parameter of the user equipment that is generated by the application server according to the fountain coding capability supportive information of the user equipment and is used to transmit the fountain coding data block.

According to a second aspect, an access network device is provided, including: an allocation unit, configured to: after it is determined that user equipment gains access locally, allocate an Internet Protocol IP address to the user equipment; and a transceiver unit, configured to send, to the user equipment, the IP address allocated by the allocation unit to the user equipment, so that the user equipment sends the IP address to an application server, and receives a data transmission service provided by the application server by using the IP address, where the application server is a server configured to manage mobility of a terminal and service quality.

With reference to the second aspect, in a first possible implementation manner, the transceiver unit is further configured to: before the IP address is allocated to the user equipment, send a request message to the application server, where the request message is used to request the application server to perform a communication initialization process with the access network device, and receive a response message that is generated by the application server according to the request message, where the response message is used to determine that communication initialization between the access network device and the application server is completed.

According to a third aspect, an application server is provided, including: a transceiver unit, configured to receive an Internet Protocol IP address sent by user equipment, where the IP address is allocated by an access network device; and a data transmission service providing unit, configured to provide a data transmission service for the user equipment by using the IP address that is received by the transceiver unit and that is corresponding to the user equipment, where the application server is a server configured to manage mobility of a terminal and service quality.

With reference to the third aspect, in a first possible implementation manner, the transceiver unit is further configured to: before receiving the IP address sent by the user equipment, receive a request message sent by the access network device, where the request message is used to request the application server to perform a communication initialization process with the access network device.

With reference to the first possible implementation manner of the third aspect, in a second possible implementation manner, the application server further includes: a generation unit, configured to: generate a response message according to the request message received by the transceiver unit, and send the response message to the transceiver unit, where the response message is used to determine that communication initialization between the access network device and the application server is completed.

With reference to the second possible implementation manner of the third aspect, in a third possible implementation manner, the transceiver unit is further configured to: receive the response message generated by the generation unit, and send the response message to the access network device.

With reference to the third aspect, in a fourth possible implementation manner, the transceiver unit is further configured to: when receiving the IP address sent by the user equipment, receive a user identity sent by the user equipment, and verify, according to the user identity, whether a user corresponding to the user equipment is valid.

With reference to the third aspect, in a fifth possible implementation manner, when the user equipment accesses at least one other accessible access network, and obtains an IP address corresponding to the at least one other access network, the transceiver unit is further configured to receive the IP address that is sent by the user equipment and that is corresponding to the at least one other access network.

With reference to the fifth possible implementation manner of the third aspect, in a sixth possible implementation manner, when there are at least two IP addresses that are sent by the user equipment and are received by the application server, the data transmission service providing unit is specifically configured to provide the data transmission service for the user equipment by separately using the at least two IP addresses.

With reference to the sixth possible implementation manner of the third aspect, in a seventh possible implementation manner, the transceiver unit is further configured to: when any IP address corresponding to the user equipment is in a no-longer-being-used state, receive the IP address and information about disconnecting from an access network corresponding to the IP address that are sent by the user equipment.

With reference to the seventh possible implementation manner of the third aspect, in an eighth possible implementation manner, the data transmission service providing unit is further configured to determine, according to the IP address and the information about disconnecting from the access network corresponding to the IP address that are received by the transceiver unit, that the IP address and the access network corresponding to the IP address are not used locally to provide a data transmission service for the user equipment.

With reference to the eighth possible implementation manner of the third aspect, in a ninth possible implementation manner, when the IP address is the last IP address that the user equipment has, the transceiver unit is further configured to: when receiving the IP address and the information about disconnecting from the access network corresponding to the IP address that are sent by the user equipment, receive a tracking area identity that is broadcast by an access network device in at least one access network and is sent by the user equipment.

With reference to the ninth possible implementation manner of the third aspect, in a tenth possible implementation manner, the application server further includes: a query unit, configured to: when it is determined to page the user equipment, query, in a locally stored mapping table according to the tracking area identity received by the transceiver unit, one or more access network device identities corresponding to the tracking area identity.

With reference to the fifth possible implementation manner to the tenth possible implementation manner of the third aspect, in an eleventh possible implementation manner, when the data transmission service is downlink data transmission, the data transmission service providing unit is specifically configured to: send the downlink data to a local Multipath Transmission Control Protocol MPTCP entity for processing; control the MPTCP entity to send processed downlink data to different User Datagram Protocol UDP/IP entities respectively for processing; and control the different UDP/IP entities to send processed downlink data to the user equipment by respectively using access networks corresponding to the at least two IP addresses.

With reference to the eleventh possible implementation manner of the third aspect, in a twelfth possible implementation manner, the transceiver unit is further configured to receive first reception success acknowledgement information sent by an MPTCP entity in the user equipment.

With reference to the eleventh possible implementation manner or the twelfth possible implementation manner of the third aspect, in a thirteenth possible implementation manner, the downlink data that is sent by the data transmission service providing unit to the different UDP/IP entities for processing is fountain coding data blocks.

With reference to the thirteenth possible implementation manner of the third aspect, in a fourteenth possible implementation manner, the transceiver unit is specifically configured to receive a first MPTCP status report sent by the MPTCP entity in the user equipment, where the first MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the fifth possible implementation manner to the tenth possible implementation manner of the third aspect, in a fifteenth possible implementation manner, when the data transmission service is uplink data transmission, the data transmission service providing unit is specifically configured to: receive uplink data that is sent by the user equipment by using the at least two IP addresses as source IP addresses; send the uplink data of the different source IP addresses to different local IP/UDP entities respectively, where one IP/UDP entity is corresponding to one IP address; aggregate, at a local MPTCP entity, the uplink data respectively processed by the IP/UDP entities; and when a preset condition of the application server is met, control the MPTCP entity to generate second reception success acknowledgement information.

With reference to the fifteenth possible implementation manner of the third aspect, in a sixteenth possible implementation manner, the transceiver unit is specifically configured to send, to the user equipment, the second reception success acknowledgement information generated by the data transmission service providing unit.

With reference to the fifteenth possible implementation manner or the sixteenth possible implementation manner of the third aspect, in a seventeenth possible implementation manner, the data transmission service providing unit is further configured to aggregate, at the MPTCP entity, fountain coding data blocks processed by the different IP/UDP entities.

With reference to the seventeenth possible implementation manner of the third aspect, in an eighteenth possible implementation manner, the data transmission service providing unit is specifically configured to: when it is determined that one or more fountain coding source data blocks are successfully obtained by means of decoding, generate a second MPTCP status report; or when a preset period arrives, generate a second MPTCP status report, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the eighteenth possible implementation manner of the third aspect, in a nineteenth possible implementation manner, the transceiver unit is specifically configured to send, to the user equipment, the second MPTCP status report generated by the data transmission service providing unit.

With reference to the thirteenth possible implementation manner to the fourteenth possible implementation manner, and the seventeenth possible implementation manner to the nineteenth possible implementation manner of the third aspect, in a twentieth possible implementation manner, the transceiver unit is further configured to: before the fountain coding data block is transmitted, send fountain coding capability supportive information of the application server to the user equipment, and receive a fountain code coding/decoding related configuration parameter of the application server that is generated by the user equipment according to the fountain coding capability supportive information of the application server and is used to transmit the fountain coding data block.

According to a fourth aspect, a communication method is provided, including: obtaining, by user equipment, an Internet Protocol IP address that is allocated by an access network device to the user equipment; notifying, by the user equipment, the IP address to an application server, where the application server is a server configured to manage mobility of a terminal and service quality; and receiving, by the user equipment, a data transmission service provided by the application server by using the IP address.

With reference to the fourth aspect, in a first possible implementation manner, when notifying the IP address to the application server, the user equipment notifies a user identity to the application server, so that the application server verifies, according to the user identity, whether a user is valid.

With reference to the fourth aspect, in a second possible implementation manner, after accessing an access network corresponding to the access network device, if it is detected, according to a preset rule, that at least one other accessible access network is available, the user equipment requests to access the at least one other access network, where the other access network is a cellular network or a non-cellular network.

With reference to the second possible implementation manner of the fourth aspect, in a third possible implementation manner, after accessing the at least one other access network, the user equipment obtains an IP address corresponding to the at least one other access network; and notifies the IP address corresponding to the at least one other access network to the application server.

With reference to the second possible implementation manner of the fourth aspect, in a fourth possible implementation manner, when determining that any IP address is in a no-longer-being-used state, the user equipment disconnects from an access network corresponding to the IP address; and notifies, to the application server, the IP address and information about disconnecting from the access network corresponding to the IP address, so that the application server no longer uses the IP address to provide a data transmission service for the user equipment.

With reference to the fourth possible implementation manner of the fourth aspect, in a fifth possible implementation manner, after disconnecting from all access networks corresponding to the user equipment, the user equipment receives a tracking area identity broadcast by an access network device in at least one access network; and notifies the received tracking area identity to the application server, so that the application server determines corresponding one or more access network device identities according to the tracking area identity when the user equipment is paged.

With reference to the second possible implementation manner to the fifth possible implementation manner of the fourth aspect, in a sixth possible implementation manner, when there are at least two IP addresses corresponding to the user equipment, the user equipment receives the data transmission service provided by the application server by separately using the at least two IP addresses.

With reference to the sixth possible implementation manner of the fourth aspect, in a seventh possible implementation manner, when the data transmission service is a downlink data transmission service, the user equipment receives downlink data that is sent by the application server by using the at least two IP addresses as different destination IP addresses respectively; the user equipment sends the downlink data of the different destination IP addresses to different IP/User Datagram Protocol UDP entities in the user equipment respectively, where one IP/UDP entity is corresponding to one destination IP address; and aggregates, at a Multipath Transmission Control Protocol MPTCP entity in the user equipment, the downlink data respectively processed by the IP/UDP entities; and when a preset condition of the user equipment is met, the user equipment controls the MPTCP entity to send first reception success acknowledgement information to the application server.

With reference to the seventh possible implementation manner of the fourth aspect, in an eighth possible implementation manner, the downlink data processed by the different IP/UDP entities is a fountain coding data block.

With reference to the eighth possible implementation manner of the fourth aspect, in a ninth possible implementation manner, when determining that one or more fountain coding source data blocks are successfully obtained by means of decoding, the user equipment sends a first MPTCP status report to the application server; or the user equipment sends a first MPTCP status report to the application server according to a preset period, where the first MPTCP status report includes an identity of one or more fountain coding source data blocks and information about whether reception is successful, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the ninth possible implementation manner of the fourth aspect, in a tenth possible implementation manner, when the data transmission service is an uplink data transmission service, the user equipment sends the uplink data to an MPTCP entity in the user equipment for processing; the user equipment controls the MPTCP entity to send processed uplink data to different UDP/IP entities respectively for processing; the user equipment controls the different UDP/IP entities to send processed uplink data to the application server by respectively using access networks corresponding to the at least two IP addresses; and the user equipment receives second reception success acknowledgement information sent by an MPTCP entity in the application server.

With reference to the tenth possible implementation manner of the fourth aspect, in an eleventh possible implementation manner, the uplink data that is sent to the different UDP/IP entities for processing is fountain coding data blocks.

With reference to the eleventh possible implementation manner of the fourth aspect, in a twelfth possible implementation manner, the user equipment receives a second MPTCP status report sent by the MPTCP entity in the application server, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the eighth possible implementation manner to the ninth possible implementation manner, and the eleventh possible implementation manner to the twelfth possible implementation manner of the fourth aspect, in a thirteenth possible implementation manner, before transmitting the fountain coding data block, the user equipment sends fountain coding capability supportive information of the user equipment to the application server, and receives a fountain code coding/decoding related configuration parameter of the user equipment that is generated by the application server according to the fountain coding capability supportive information of the user equipment and is used to transmit the fountain coding data block.

According to fifth aspect, a communication method is provided, including: after determining that user equipment gains access locally, allocating, by an access network device, an Internet Protocol IP address to the user equipment; and sending, by the access network device, the IP address to the user equipment, so that the user equipment sends the IP address to an application server, and receives a data transmission service provided by the application server by using the IP address, where the application server is a server configured to manage mobility of a terminal and service quality.

With reference to the fifth aspect, in a first possible implementation manner, before allocating the IP address to the user equipment, the access network device sends a request message to the application server, where the request message is used to request the application server to perform a communication initialization process with the access network device; and receives a response message that is generated by the application server according to the request message, where the response message is used to determine that communication initialization between the access network device and the application server is completed.

According to a sixth aspect, a communication method is provided, including: receiving, by an application server, an Internet Protocol IP address sent by user equipment, where the IP address is allocated by an access network device; and providing, by the application server, a data transmission service for the user equipment by using the IP address.

With reference to the sixth aspect, in a first possible implementation manner, before receiving the IP address sent by user equipment, the application server receives a request message sent by the access network device, where the request message is used to request the application server to perform a communication initialization process with the access network device; and generates a response message according to the request message, and sends the response message to the access network device, where the response message is used to determine that communication initialization between the access network device and the application server is completed.

With reference to the sixth aspect, in a second possible implementation manner, when receiving the IP address sent by user equipment, the application server receives a user identity sent by the user equipment, and verifies, according to the user identity, whether a user corresponding to the user equipment is valid.

With reference to the sixth aspect, in a third possible implementation manner, when the user equipment accesses at least one other accessible access network, and obtains an IP address corresponding to the at least one other access network, the application server receives the IP address that is sent by the user equipment and that is corresponding to the at least one other access network.

With reference to the third possible implementation manner of the sixth aspect, in a fourth possible implementation manner, when there are at least two IP addresses that are sent by the user equipment and are received by the application server, a data transmission service is provided for the user equipment by separately using the at least two IP addresses.

With reference to the fourth possible implementation manner of the sixth aspect, in a fifth possible implementation manner, when any IP address corresponding to the user equipment is in a no-longer-being-used state, the application server receives the IP address and information about disconnecting from an access network corresponding to the IP address that are sent by the user equipment; and the application server determines that the IP address and the access network corresponding to the IP address are not used locally to provide a data transmission service for the user equipment.

With reference to the fifth possible implementation manner of the sixth aspect, in a sixth possible implementation manner, when the IP address is the last IP address that the user equipment has, and when receiving the IP address and the information about disconnecting from the access network corresponding to the IP address that are sent by the user equipment, the application server receives a tracking area identity that is broadcast by an access network device in at least one access network and is sent by the user equipment; and when it is determined to page the user equipment, queries, in a locally stored mapping table according to the tracking area identity, one or more access network device identities corresponding to the tracking area identity.

With reference to the fourth possible implementation manner to the sixth possible implementation manner of the sixth aspect, in a seventh possible implementation manner, when the data transmission service is downlink data transmission, the application server sends the downlink data to a local Multipath Transmission Control Protocol MPTCP entity for processing; the application server controls the MPTCP entity to send processed downlink data to different User Datagram Protocol UDP/IP entities respectively for processing; the application server controls the different UDP/IP entities to send processed downlink data to the user equipment by respectively using access networks corresponding to the at least two IP addresses; and the application server receives first reception success acknowledgement information sent by an MPTCP entity in the user equipment.

With reference to the seventh possible implementation manner of the sixth aspect, in an eighth possible implementation manner, the downlink data that is sent to the different UDP/IP entities for processing is fountain coding data blocks.

With reference to the eighth possible implementation manner of the sixth aspect, in a ninth possible implementation manner, the application server receives a first MPTCP status report sent by the MPTCP entity in the user equipment, where the first MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the fourth possible implementation manner to the sixth possible implementation manner of the sixth aspect, in a tenth possible implementation manner, when the data transmission service is uplink data transmission, the application server receives uplink data that is sent by the user equipment by using the at least two IP addresses as source IP addresses; the application server sends the uplink data of the different source IP addresses to different local IP/UDP entities respectively, where one IP/UDP entity is corresponding to one IP address; and aggregates, at a local MPTCP entity, the uplink data respectively processed by the IP/UDP entities; and when a preset condition of the application server is met, the application server controls the MPTCP entity to send second reception success acknowledgement information to the user equipment.

With reference to the tenth possible implementation manner of the sixth aspect, in an eleventh possible implementation manner, the uplink data processed by the different IP/UDP entities is a fountain coding data block.

With reference to the eleventh possible implementation manner of the sixth aspect, in a twelfth possible implementation manner, when determining that one or more fountain coding source data blocks are successfully obtained by means of decoding, the application server sends a second MPTCP status report to the user equipment; or the application server sends a second MPTCP status report to the user equipment according to a preset period, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

With reference to the eighth possible implementation manner to the ninth possible implementation manner, and the eleventh possible implementation manner to the twelfth possible implementation manner of the sixth aspect, in a thirteenth possible implementation manner, before transmitting the fountain coding data block, the application server sends fountain coding capability supportive information of the application server to the user equipment; and receives a fountain code coding/decoding related configuration parameter of the application server that is generated by the user equipment according to the fountain coding capability supportive information of the application server and is used to transmit the fountain coding data block.

In the embodiments of the present invention, an access network device allocates an Internet Protocol (Internet Protocol, IP) address to UE, and after the UE notifies the IP address to an application server, the application server performs a data transmission service for the UE by using the IP address. By using the technical solutions of the present invention, a PDN-GW, an SGW, a PCRF entity, an MME, and an HSS in an existing wireless communications network are deleted, and functions of the foregoing network side devices are implemented by using the access network device and the application server. Therefore, it is avoided that an SGW-to-PDN-GW link becomes a bottleneck of a processing capability of the wireless communications network, network layers are greatly reduced, a data transmission delay is effectively reduced, and a network paralysis risk is reduced.

BRIEF DESCRIPTION OF THE DRAWINGS

FIG. 19 is a schematic diagram of an MPTCP status report in a specific application scenario according to an embodiment of the present invention;

DETAILED DESCRIPTION

Figure 1:
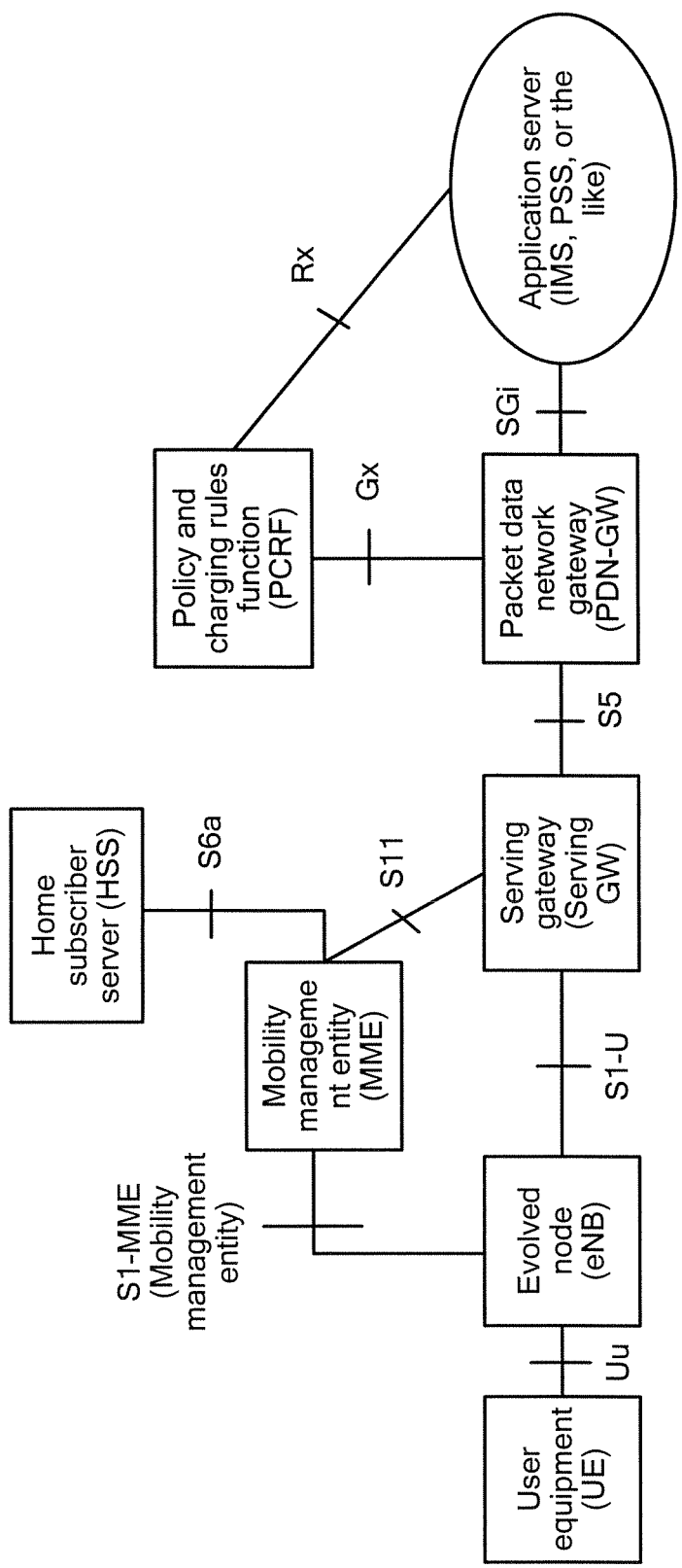
FIG. 1 is a schematic diagram of a wireless communications network architecture in the prior art.
Figure 2:
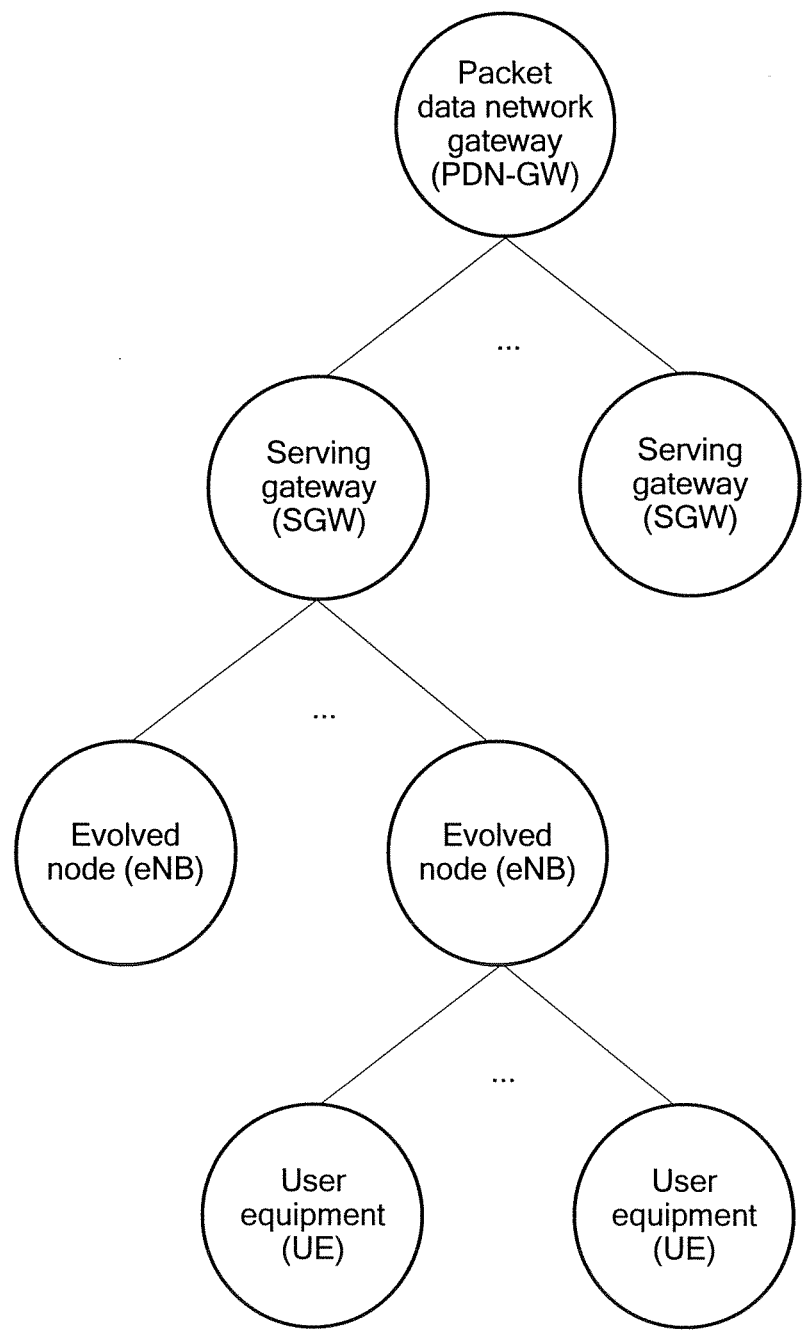
FIG. 2 is a schematic diagram of a tree structure of a wireless communications network in the prior art.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA), a general packet radio service (General Packet Radio Service, GPRS), a Long Term Evolution (Long Term Evolution, LTE) system, a Long Term Evolution Advanced (Advanced long term evolution, LTE-A) system, and a Universal Mobile Telecommunication System (Universal Mobile Telecommunication System, UMTS).

It should further be understood that in the embodiments of the present invention, user equipment includes but is not limited to a mobile station (MS, Mobile Station), a mobile terminal (Mobile Terminal), a mobile telephone (Mobile Telephone), a handset (handset), portable equipment (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communications function; or the user equipment may be a portable, pocket-sized, handheld, computer built-in, or in-vehicle mobile apparatus.

The base station (for example, an access point) in the embodiments of the present invention may refer to a device in communication with a wireless terminal by using one or more sectors (or channels) at an air interface in an access network. The base station may be configured to mutually convert a received over-the-air frame and an IP packet and serve as a router between the wireless terminal and the Internet (Internet). The Internet may include an Internet protocol (IP) network. The base station may further coordinate attribute management of the air interface. For example, the base station may be a base transceiver station (BTS, Base Transceiver Station) in GSM or CDMA, or may be a nodeB (NodeB) in WCDMA, or may further be an evolved NodeB (NodeB, eNB, or e-NodeB, evolutional Node B) in LTE. This is not limited in the present invention.

To resolve problems of a large data transmission delay and a high risk of network paralysis for a current wireless communications network, in the embodiments of the present invention, a PDN-GW, an SGW, a PCRF entity, an MME, and an HSS in an existing wireless communications network are deleted, an access network device allocates an IP address to UE, and an application server performs a data transmission service for the UE by using the IP address. Therefore, it is avoided that an SGW-to-PDN-GW link becomes a bottleneck of a processing capability of the wireless communications network, network flattening is implemented, a data transmission delay is effectively reduced, and a network paralysis risk is reduced.

In the following, preferable implementation manners of the present invention are described in detail with reference to the accompanying drawings.

Figure 3:
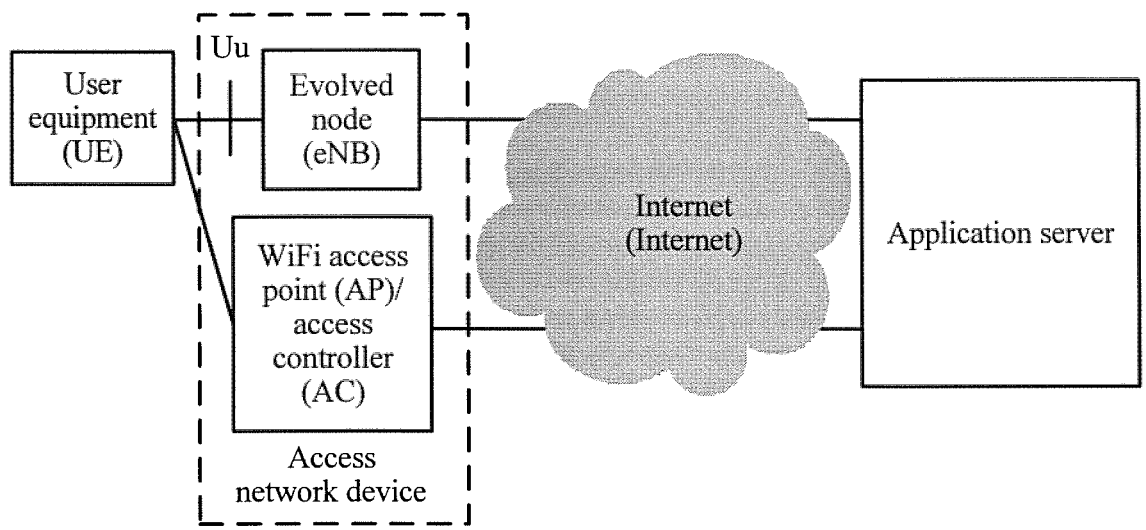
FIG. 3 is a first schematic diagram of a wireless communications network architecture according to an embodiment of the present invention.

For a diagram of a wireless communications network architecture, refer to FIG. 3. The wireless communications network includes at least one UE, at least one cellular access network device (for example, an eNB), and an application server. In addition, the wireless communications network may include at least one non-cellular access network device, such as an access point (Access Point, AP) or an access controller (Access Control, AC).

Figure 4:
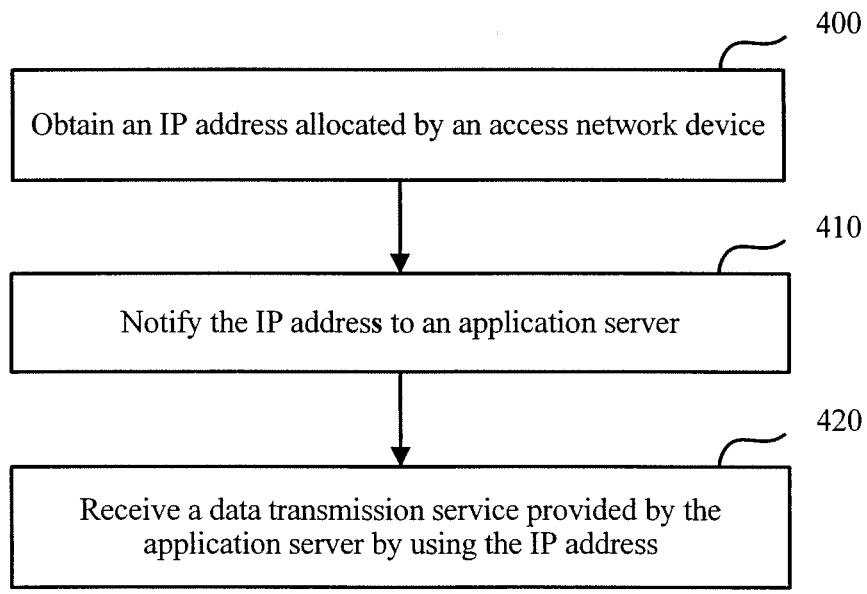
FIG. 4 is a first flowchart of communication between devices in a wireless communications network according to an embodiment of the present invention.

Referring to FIG. 4, in an embodiment of the present invention, a procedure of communication between UE and each device in a wireless communications network includes the following steps.

Step 400: Obtain an IP address allocated by an access network device.

In this embodiment of the present invention, after the UE is enabled, an available access network is scanned. After an accessible access network that meets a preset rule is detected, the accessible access network that meets the preset rule is accessed. The preset rule is a rule preset according to a specific application scenario. The preset rule includes a rule of a priority of selecting an access network, a channel quality threshold, or the like. The preset rule is stipulated in a protocol, or is stipulated according to configuration information of the UE, or is stipulated according to a policy created by an application server.

Optionally, when the access network is a cellular network, the UE obtains an IP address that is allocated, to the UE, by an access network device corresponding to the cellular network; when the access network is a non-cellular network, the UE obtains an IP address corresponding to the non-cellular network. The cellular network is a cellular network that is first accessed by the UE after the UE is enabled, that is, after the UE is enabled, the UE is connected to no cellular network before accessing the cellular network.

Further, after it is determined that the UE has accessed the cellular network, if it is detected, according to the preset rule, that at least one other accessible access network is available, the UE requests to access the at least one other access network. The other access network is a cellular network (for example, a 3GPP network) or a non-cellular network (for example, a WiFi network or a WiMax network). The preset rule is a rule preset according to a specific application scenario, and the preset rule includes a rule of a priority of selecting an access network, a channel quality threshold, or the like.

Optionally, after accessing the at least one other access network, the UE obtains an IP address corresponding to the at least one other access network. When the other access network is a cellular network, the IP address is allocated by an access network device corresponding to the cellular network; when the other access network is a non-cellular network, the IP address is allocated by a core network device or an access network device corresponding to the non-cellular network.

In the foregoing process, the UE has the IP address that is allocated by the access network device corresponding to the first accessed cellular network and the IP address corresponding to the at least one other access network. For example, after being enabled, the UE first accesses a cellular network, and an access network device corresponding to the cellular network allocates a first IP address to the UE. After accessing the cellular network, when determining, according to the preset rule, that both a first other access network and a second other access network are available access networks, the UE obtains an IP address corresponding to the first other access network and uses the IP address as a second IP address, and obtains an IP address corresponding to the second other access network and uses the IP address as a third IP address. In this case, the UE has three IP addresses.

Step 410: Notify the IP address to an application server.

In this embodiment of the present invention, the UE reports, to the application server, the IP address that the UE has. The application server may be an over the top (Over The Top, OTT) server, that is, the application server is a server configured to manage mobility of a terminal, service quality, and the like. For example, the application server may be a server that is provided by each service provider. Generally, each time the UE accesses a new access network or disconnects from an access network, the UE reports, to the application server, an IP address that the UE has, so that the application server knows the IP address that the application server can use to provide a data transmission service for the UE.

Optionally, when notifying, to the application server, the IP address that the UE has, the UE notifies a user identity to the application server, so that the application server verifies, according to the user identity, whether a user is valid. The user identity may be information, such as a user's name or a password, corresponding to the application server, or may be a universal subscriber identity module (University Subscribe Identity Module, USIM). When the access network is a cellular network, the UE may send all the IP addresses and the user identity to the application server by adding all the IP addresses and the user identity to an attach request message; when the access network is a non-cellular network, the UE may send all the IP addresses and the user identity to the application server by adding all the IP addresses and the user identity to a registration request message. An access network device identity is an IP address of an access network device or another identity.

Step 420: Receive a data transmission service provided by the application server by using the IP address.

In this embodiment of the present invention, when the application server verifies that the user corresponding to the UE is valid, the application server provides various data transmission services for the UE, for example, a web browsing service, a video play service, a call service, and an SMS transceiver service. Optionally, when the UE has only one IP address, the UE receives a data transmission service provided by the application server by using the IP address; when the UE has at least two IP addresses, the UE may receive a data transmission service provided by the application server by separately using one or the at least two IP addresses. For example, when the UE has three IP addresses, that is, a first IP address, a second IP address, and a third IP address, the application server may provide a data transmission service for the UE by using the first IP address, the second IP address, and the third IP address, that is, the application server uses each IP address as a destination address of a link, and may provide a data transmission service for the UE by using a maximum of three links.

Further, corresponding to the registration request message that is sent by the UE to the application server, when verifying that the user corresponding to the UE is valid, the application server feeds back a registration success message to the UE. The registration success message may include a key used when the application server communicates with the UE and/or policy information that instructs the UE to perform autonomous link scanning and link adding and removing. Corresponding to the attach request message that is sent by the UE to the application server, the application server may add, to newly created signaling or signaling stipulated in an existing protocol, a key used when the application server communicates with the UE and/or policy information that instructs the UE to perform autonomous link scanning and link adding and removing. In addition, the policy information for the UE to perform autonomous link scanning and link adding and removing may be preconfigured locally in the UE, and the policy information for autonomous link scanning and link adding and removing includes a condition (for example, scanning is performed according to a preset air interface channel quality threshold) that is met when the UE performs access network scanning and a condition that an access network accessed by the UE should meet.

The UE performs link adding and removing based on the policy information for autonomous link scanning and link adding and removing that is preconfigured or that is delivered by the application server. When any IP address that the UE has changes in processes in which the UE performs link adding and removing, for example, when a new IP address is added or an existing IP address is deleted, the UE needs to notify a link change status to the application server, that is, the UE needs to notify the newly added IP address or the deleted IP address to the application server. When the UE deletes the existing IP address, a specific process in which the UE performs link removing includes: when the UE determines that any IP address in all IP addresses that the UE has is in a no-longer-being-used state, disconnecting from an access network corresponding to the IP address, and notifying, to the application server in an explicit manner or in an implicit manner, the IP address and information about disconnecting from the access network corresponding to the IP address, so that the application server no longer uses the IP address to provide a data transmission service locally. That the IP address is in the no-longer-being-used state is that the UE receives a connection release command sent by the corresponding access network or the UE detects that a connection to the corresponding access network fails. A specific process in which the UE performs link adding includes: when the UE accesses a new access network (for example, an independent WiFi network) according to the policy information for autonomous link scanning and link adding and removing, obtaining, by the UE, an IP address corresponding to the new access network and notifying the IP address to the application server.

Further, when receiving the IP address that is in the no-longer-being-used state and the information about disconnecting from the access network corresponding to the IP address that are sent by the UE, or the newly added IP address sent by the UE, the application server processes the information sent by the UE, and generates a link update acknowledgement message and sends the link update acknowledgement message to the UE. After receiving the link update acknowledgement message, the UE may determine that the application server has learned an IP address corresponding to an access network currently available to the UE.

Optionally, the processes in which the UE performs link adding and removing may be controlled by a macro base station. When the processes are controlled by the macro base station, if the UE has accessed the macro base station, and the UE autonomously adds a specific access point in coverage of the macro base station as a link, the specific access point notifies access information of the UE to the macro base station. The macro base station provides a data transmission service for the UE by using the specific access point as an offloading site by using an MSA (multi-stream aggregation, Multiple Stream Aggregation) technology. Because the IP address of the UE has been allocated by the macro base station, the specific access point does not need to allocate a new IP address to the UE. In this way, the specific access point is invisible to the application server, the macro base station distributes some downlink data to the specific access point, and the macro base station receives uplink data of the specific access point and forwards the uplink data to the application server.

By using the technical solution, an access network device allocates an IP address to UE, and the UE autonomously performs link adding and removing, so as to ensure service continuity of the UE in a connected state.

In the foregoing process, the UE receives a data transmission service provided by the application server by using all IP addresses that the UE has. In this case, the UE and the access network are in a connected state, that is, the UE is in a connected state. After the UE disconnects from all access networks (including the following: an access network actively releases a connection to the UE, or the UE actively releases a connection of the UE, or the UE detects a connection failure and performs disconnection), the UE is in an idle state. In this case, the UE receives a tracking area identity broadcast by an access network device corresponding to an access network on which the UE camps (Camp). Each access network device has a tracking area (Track Area, TA) to which the access network device belongs. Different access network devices may belong to different tracking areas; for example, a tracking area to which an access network device 1 belongs is TA1, and a tracking area to which an access network device 2 belongs is TA2. Different access network devices may belong to a same tracking area; for example, both a tracking area to which an access network device 1 belongs and a tracking area to which an access network device 2 belongs are TA1. Generally, a macro base station in a 3GPP network broadcasts an identity of a tracking area to which the macro base station belongs, but an access point device (for example, a Pico device or a WiFi device) controlled by the macro base station does not broadcast an identity of a tracking area to which the access point device belongs. For an independent WiFi device that is not controlled by the macro base station in the 3GPP network, if the independent WiFi device falls within a coverage area of the macro base station in the 3GPP network, the independent WiFi device may not broadcast an identity of a tracking area to which the independent WiFi device belongs, so as to reduce a quantity of sent paging messages.

Optionally, the UE notifies the tracking area identity to the application server, so that the application server determines corresponding one or more access network device identities according to the tracking area identity when the UE is paged. The tracking area identity may be notified to the application server when the UE notifies, to the application server, information about disconnecting from all access networks. The UE may notify, to the application server by using a heartbeat message, the IP address that is no longer used, the information about disconnecting from the access network corresponding to the IP address, and the tracking area identity received by the UE.

Further, when the UE is in an idle state, if the UE is moved from one tracking area to another tracking area, the UE initiates a tracking area update procedure to the application server, so as to report, to the application server, an access network device identity and/or a tracking area identity updated by the UE. Optionally, the UE may periodically report, to the application server by using a heartbeat message, a current tracking area identity corresponding to the UE.

Optionally, the application server locally stores a mapping relationship table, and the mapping relationship table includes a mapping relationship between a tracking area identity and an access network device identity. The access network device identity is an IP address of an access network device or another identity. When receiving a call request of the UE in an idle state, the application server searches the mapping relationship table for one or more access network device identities corresponding to the UE, and sends a paging message to an access network device corresponding to the one or more access network device identities. After receiving the paging message, the UE accesses an access network corresponding to the one or more access network devices, that is, a state of the UE is changed to a connected state.

Optionally, when the UE is in a coverage area of the macro base station, the application server may send a paging message only to the macro base station, and does not need to send a paging message to an access point device managed by the macro base station, so as to reduce signaling interaction, and reduce a system overhead.

By using the technical solution, an application server manages a tracking area identity corresponding to UE, and a mapping relationship between the tracking area identity and each access network device identity. When the UE is in an idle state, the application server can page the UE according to the tracking area identity corresponding to the UE and a table of the mapping relationship between the tracking area identity and each access network device identity, so that the UE switches from the idle state to a connected state, and incoming call accessibility of the UE is implemented.

Figure 5:
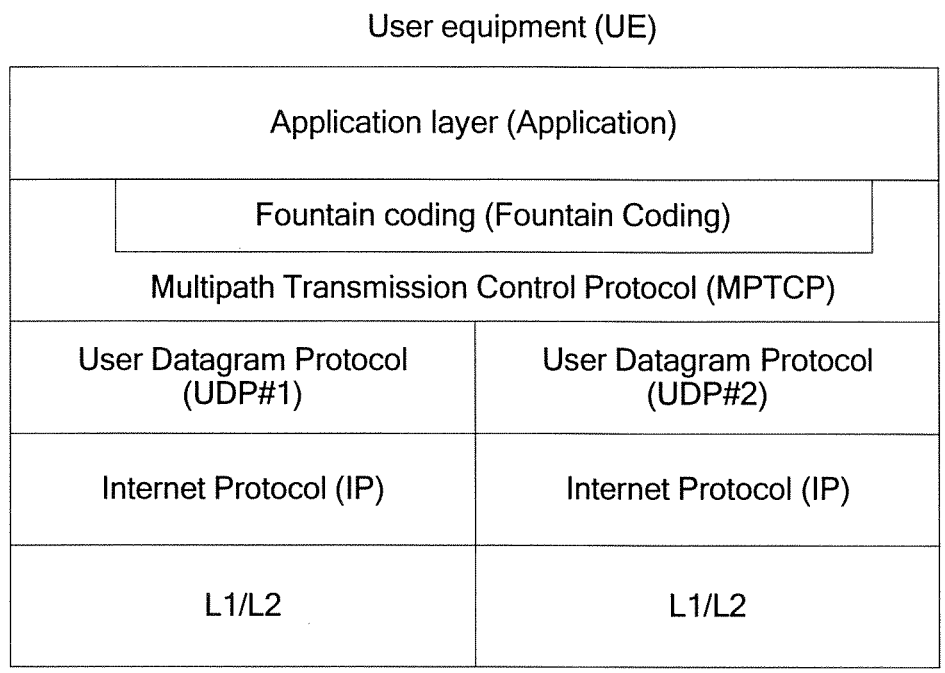
FIG. 5 is a schematic diagram of a protocol stack corresponding to UE according to an embodiment of the present invention.

Optionally, referring to FIG. 5, FIG. 5 is a schematic diagram of a protocol stack corresponding to the UE according to this embodiment of the present invention. An aggregation layer of the UE is a TCP layer, and a highest protocol layer of all branches corresponding to different links is a User Datagram Protocol (User Datagram Protocol, UDP). When the data transmission service provided by the application server for the UE is a downlink data transmission service, a process in which the UE receives the data transmission service provided by the application server by using the at least two IP addresses specifically includes: receiving, by the UE, downlink data that is sent by the application server by using the at least two IP addresses as destination IP addresses; sending the downlink data of the different destination IP addresses to different local IP/UDP entities respectively, where one IP/UDP entity is corresponding to one IP address; respectively processing, by all the IP/UDP entities that receive the downlink data, the downlink data of the corresponding IP addresses; and after the downlink data processed by the IP/UDP entities is aggregated at a local Multipath Transmission Control Protocol (Multi-Path TCP, MPTCP) entity, when the MPTCP entity receives processed downlink data respectively sent by all or some of the IP/TCP entities, sending, by the MPTCP entity, first reception success acknowledgement information to the application server if a preset condition of the user equipment is met. For example, when the UE has a first IP address and a second IP address, and when the UE receives downlink data that is sent by the application server by using both the first IP address and the second IP address, the UE sends first downlink data corresponding to the first IP address to a first local IP/UDP entity in the UE, and sends second downlink data corresponding to the second IP address to a second local IP/UDP entity in the UE. The first local IP/UDP entity in the UE processes the first downlink data, and the second local IP/UDP entity in the UE processes the second downlink data. The first local IP/UDP entity in the UE sends processed first downlink data to a local MPTCP entity in the UE, and the second local IP/UDP entity in the UE sends processed second downlink data to the local MPTCP entity in the UE.

Optionally, the downlink data processed by the different IP/UDP entities is a fountain coding data block.

Optionally, when the preset condition of the user equipment is met, a process in which the local MPTCP entity in the UE sends the first reception success acknowledgement information to the application server specifically includes: when determining that one or more fountain coding source data blocks are successfully obtained by means of decoding, sending, by the UE, a first MPTCP status report to the application server; or sending, by the UE, a first MPTCP status report to the application server according to a preset period, where the first MPTCP status report includes an identity of one or more fountain coding source data blocks and information about whether the one or more fountain coding source data blocks are successfully received, or includes a quantity of fountain coding data blocks that have been successfully received separately for one or more fountain coding source data blocks, or includes a quantity of fountain coding data blocks that further need to be successfully received separately for one or more fountain coding source data blocks, and the fountain coding data block is generated by encoding the fountain coding source data block. In the foregoing process, that the UE determines that the one or more fountain coding source data blocks are successfully obtained by means of decoding is used as a trigger condition, or another trigger condition may be preset. When the preset trigger condition is met, the UE sends the first MPTCP status report to the application server, and a specific trigger condition is determined by a user according to a specific situation. In the foregoing process, the first reception success acknowledgement message is the first MPTCP status report.

Further, the application server determines, according to the first MPTCP status report, a fountain coding data block that needs to be transmitted to the UE.

Optionally, if a speed of transmitting downlink data on any link corresponding to the UE is less than a preset threshold, an MPTCP entity in the application server stops distributing downlink data to the any link or reduces downlink data distributed to the any link for transmission, and distributes more downlink data, for transmission, to any remaining one or more links except the any link in all links corresponding to the UE.

By using the technical solution, a protocol stack of UE is modified. After successfully decoding at least one fountain coding source data, the UE sends first reception success acknowledgement information to an application server, so as to avoid a problem, caused by a congestion control mechanism of a TCP layer when a highest protocol layer of all branches in the existing UE is the TCP layer, that TCP ACK feedback needs to be performed each time a data packet is successfully transmitted, effectively improve a downlink throughput of a wireless communications network, improve an overall transmission rate, and effectively reduce energy consumption of the UE. In addition, when a fountain coding technology is used to transmit downlink data, fountain coding data may be distributed from a link with a relatively low transmission speed to a link with a relatively high transmission speed, and there is no need to retransmit, on the link to which the fountain coding data is distributed, downlink data that is unsuccessfully transmitted on the link from which the fountain coding data is distributed, so as to greatly reduce complexity of processing data by the application server during distribution between links.

Optionally, referring to the schematic diagram of the protocol stack corresponding to the UE shown in FIG. 5, when the data transmission service is an uplink data transmission service, a process in which the UE receives the data transmission service provided by the application server by using the at least two IP addresses specifically includes: sending, by the UE, uplink data to a local MPTCP entity for processing, obtaining at least two IP addresses carried in the uplink data, and using the at least two IP addresses as source IP addresses; sending, by the MPTCP entity according to a specific distribution algorithm (for example, a distribution proportion is determined according to data transmission rates of links corresponding to different UDP/IP entities), processed uplink data to different UDP/IP entities in the UE respectively for processing; sending, by the different UDP/IP entities, processed uplink data to the application server by using access networks corresponding to the corresponding IP addresses; and receiving, by the UE, second reception success acknowledgement information sent by an MPTCP entity in the application server. For example, when the UE has a first IP address and a second IP address, the UE sends uplink data to the application server by using the first IP address and the second IP address as source IP addresses. A local MPTCP entity in the UE processes the uplink data, and sends processed uplink data to a first local UDP/IP entity and a second local UDP/IP entity in the UE respectively according to a distribution algorithm. The first UDP/IP entity in the UE processes first uplink data in the uplink data, and the second UDP/IP entity in the UE processes second uplink data in the uplink data. The first UDP/IP entity in the UE sends, to the application server by using an access network corresponding to the first IP address, the first uplink data whose source address is the first IP address, and the second UDP/IP entity in the UE sends, to the application server by using an access network corresponding to the second IP address, the second uplink data whose source address is the second IP address.

In the foregoing process, when determining that a preset condition of the application server is met, the application server feeds back the second reception success acknowledgement information to the UE.

Optionally, the uplink data that is sent to the different UDP/IP entities for processing is fountain coding data blocks.

Optionally, a process in which the UE receives the second reception success acknowledgement information sent by the MPTCP entity in the application server specifically includes: receiving, by the UE, a second MPTCP status report sent by the MPTCP entity in the application server, where the second MPTCP status report includes an identity of one or more fountain coding source data blocks and information about whether reception is successful, or includes a quantity of fountain coding data blocks that have been successfully received separately for one or more fountain coding source data blocks, or includes a quantity of fountain coding data blocks that further need to be successfully received separately for one or more fountain coding source data blocks, and the fountain coding data block is generated by encoding the fountain coding source data block. In the foregoing process, the second reception success acknowledgement message is the second MPTCP status report.

Further, the UE determines, according to the second MPTCP status report, a fountain coding data block that needs to be transmitted to the application server.

Optionally, if a speed of transmitting uplink data on any link corresponding to the UE is less than a preset threshold, the local MPTCP entity in the UE stops distributing uplink data to the any link or reduces uplink data distributed to the any link, and distributes more uplink data, for transmission, to any remaining one or more links except the any link in all links corresponding to the UE.

By using the technical solution, when a fountain coding technology is used to transmit uplink data, fountain coding data may be distributed from a link with a relatively low transmission speed to a link with a relatively high transmission speed, and there is neither a need to retransmit, on the link to which the fountain coding data is distributed, data that is successfully transmitted on the link from which the fountain coding data is distributed, nor a need to retransmit, on the link to which the fountain coding data is distributed, uplink data that is unsuccessfully transmitted on the link from which the fountain coding data is distributed, so as to greatly reduce complexity of processing data at the aggregation layer of the UE during distribution between links.

Optionally, before the application server transmits the fountain coding data block to the UE, the UE sends fountain coding capability supportive information of the user equipment to the application server; and receives a fountain code coding/decoding related configuration parameter of the user equipment that is generated by the application server according to the fountain coding capability supportive information of the user equipment. The fountain code coding/decoding related configuration parameter of the user equipment includes one or any combination of the following: information such as a quantity of fountain coding data blocks included in one fountain coding source data block, a size of storage space occupied by one fountain coding data block, a period of sending the first MPTCP status report, and a trigger condition of the first MPTCP status report. The fountain coding capability supportive information of the user equipment includes: whether the UE has a capability of generating a fountain coding data block, and whether the UE has a capability of decoding a fountain coding data block.

Figure 6:
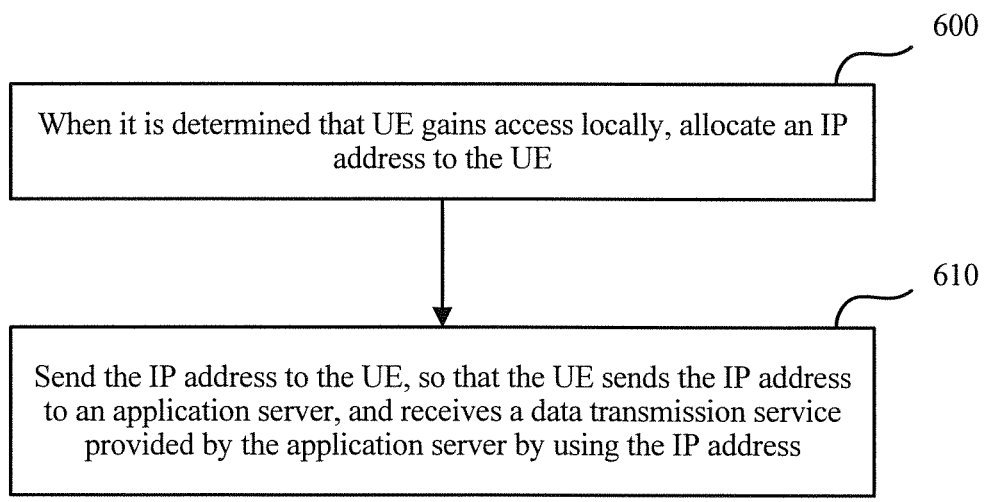
FIG. 6 is a second flowchart of communication between devices in a wireless communications network according to an embodiment of the present invention.

Based on the technical solution, referring to FIG. 6, in an embodiment of the present invention, a procedure of communication between a base station and each device in a wireless communications network includes the following steps.

Step 600: When it is determined that UE gains access locally, allocate an IP address to the UE.

In this embodiment of the present invention, after receiving an access request sent by the UE, an access network device enables, according to the access request, the UE to gain access locally. After determining that the UE accesses the access network device, the access network device allocates the IP address to the UE. The access network device is a cellular access network device, and an access network corresponding to the access network device is a cellular network.

Further, before allocating the IP address to the UE, the access network device sends a request message to an application server. The request message includes at least one of an access network device identity, a tracking area identity, or a public land mobile network (Public Land Mobile Network, PLMN) identity. The access network device receives a response message that is generated by the application server according to the request message, where the response message is used to determine that mutual communication initialization is completed.

Optionally, the request message that is sent by the access network device to the application server may be carried in a message in an existing 3GPP standard protocol, for example, an S1 interface setup request (S1 setup request) message. By using the message in the existing protocol, there is no need to redefine new signaling, thereby reducing complexity of system implementation.

Step 610: Send the IP address to the UE, so that the UE sends the IP address to an application server, and receives a data transmission service provided by the application server by using the IP address.

In this embodiment of the present invention, the access network device further reports, to the application server, an identity of a tracking area to which the access network device belongs, so that the application server stores the identity of the tracking area and an access network device identity in a mapping relationship table stored locally in the application server. After the UE disconnects from all access networks, the access network device broadcasts the identity of the tracking area to which the access network device belongs, so that the UE sends, to the application server, the received identity of the tracking area that is sent by the access network device.

By using the technical solution, an access network device allocates an IP address to UE, the UE is directly connected to an application server by using the access network device, and the application server provides a data transmission service for the UE by using the access network device. When communication quality of a wireless communications network is ensured, super-flattening of the wireless communications network is implemented, and a delay of data transmission between devices in the wireless communications network is effectively reduced. In addition, when the UE is in an idle state, the UE sends, to the application server, a tracking area identity broadcast by the access network device, and the application server can page the UE according to the tracking area identity corresponding to the UE and a mapping relationship between the tracking area identity and each access network device identity, so that the UE switches from the idle state to a connected state, and incoming call accessibility of the UE is implemented.

Figure 7:
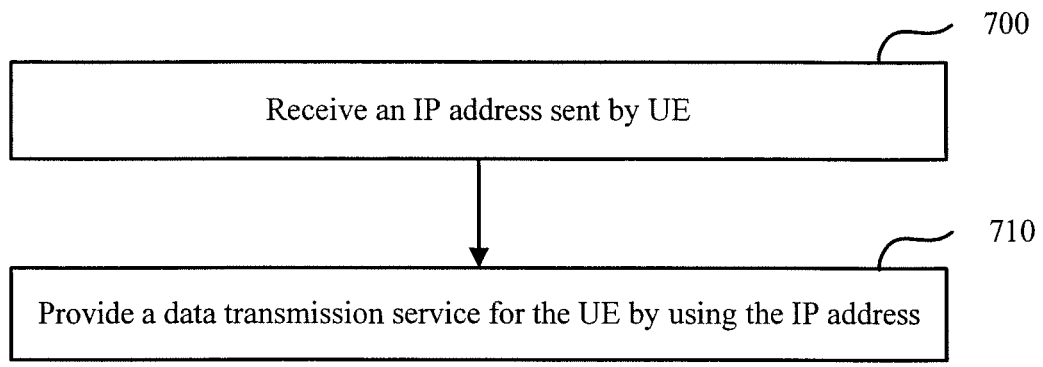
FIG. 7 is a third flowchart of communication between devices in a wireless communications network according to an embodiment of the present invention.

Based on the technical solution, referring to FIG. 7, in an embodiment of the present invention, a procedure of communication between an application server and each device in a wireless communications network includes the following steps.

Step 700: Receive an IP address sent by UE.

In this embodiment of the present invention, the application server receives a request message sent by the access network device. The request message includes at least one of an access network device identity, a tracking area identity, or a PLMN identity. The application server generates a response message according to the request message, and sends the response message to the access network device, where the response message is used to determine that mutual communication initialization is completed. Optionally, the response message that is sent by the application server to the access network device may be carried in a message in an existing 3GPP standard protocol. For example, when the request message that is sent by the UE to the application server is an S1 interface setup request (S1 setup request) message, the response message that is sent by the application server to the UE is an S1 interface setup response (S1 setup response) message. By using the message in the existing protocol, there is no need to redefine new signaling, thereby reducing complexity of system implementation.

After the UE is enabled, an available access network is scanned. After an accessible access network that meets a preset rule is detected, the accessible access network that meets the preset rule is accessed, and an IP address allocated by an access network device corresponding to the access network is obtained. The preset rule is a rule preset according to a specific application scenario. The preset rule includes a rule of a priority of selecting an access network, a channel quality threshold, or the like. The access network is a cellular network.

Optionally, after the UE determines that access to the access network has gained locally, if it is detected, according to the preset rule, that at least one other accessible access network is available, the UE requests to access the at least one other access network, and obtains an IP address corresponding to the at least one other access network. The other access network is a cellular network or a non-cellular network, the preset rule is a rule preset according to a specific application scenario, and the preset rule includes a rule of a priority of selecting an access network, a channel quality threshold, or the like.

Further, when receiving the IP address sent by the UE, the application server receives a user identity sent by the UE, and verifies, according to the user identity, whether a user corresponding to the UE is valid. The user identity may be information, such as a user's name or a password, corresponding to the application server, or may be a USIM. When the access network is a cellular network, the UE may add all the IP addresses and the user identity to an attach request message; when the access network is a non-cellular network, the UE may add all the IP addresses and the user identity to a registration request message.

Optionally, each time the UE accesses a new access network or disconnects from an access network, the UE reports, to the application server, an IP address that the UE has, so that the application server knows the IP address that the application server can use to provide a data transmission service for the UE.

Step 710: Provide a data transmission service for the UE by using the IP address.

In this embodiment of the present invention, because the UE may have at least one IP address, when the UE has one IP address, the application server provides a data transmission service for the UE by using the unique IP address; when the UE has at least two IP addresses, the application server may provide a data transmission service for the UE by separately using the at least two IP addresses.

Optionally, corresponding to the registration request message that is sent by the UE to the application server, when verifying that the user corresponding to the UE is valid, the application server feeds back a registration success message to the UE. When the application server verifies that the user corresponding to the UE is valid, the application server provides various data transmission services for the UE, for example, a web browsing service, a video play service, a call service, and an SMS transceiver service. The registration success message may include a key used when the application server communicates with the UE and/or policy information that instructs the UE to perform autonomous link scanning and link adding and removing. Corresponding to the attach request message that is sent by the UE to the application server, the application server may add, to newly created signaling or signaling stipulated in an existing protocol, a key used when the application server communicates with the UE and/or policy information that instructs the UE to perform autonomous link scanning and link adding and removing. In addition, the policy information for the UE to perform autonomous link scanning and link adding and removing may be obtained by means of local preconfiguration in the UE, and the policy information for autonomous link scanning and link adding and removing includes a condition (for example, scanning is performed according to a preset air interface channel quality threshold) that is met when the UE performs access network scanning and a condition that an access network accessed by the UE should meet.

Optionally, the UE performs link adding and removing based on the policy information for autonomous link scanning and link adding and removing that is preconfigured or that is delivered by the application server. When any IP address that the UE has changes in processes in which the UE performs link adding and removing, the UE needs to notify a link change status to the application server.

Further, in the processes in which the UE performs link adding and removing, when any IP address corresponding to the UE is in a no-longer-being-used state, the application server receives the IP address and information about disconnecting from an access network corresponding to the IP address that are sent by the UE; and the application server does not use the IP address and the access network corresponding to the IP address to provide a data transmission service for the UE. That the IP address is in the no-longer-being-used state is that the UE receives a connection release command sent by the corresponding access network or the UE detects that a connection to the corresponding access network fails. In addition, when the application server receives a link change status sent by the UE, the application server may send a link update acknowledgement message to the UE, so that the UE determines that the application server has received the link change reported by the UE.

Further, when information about disconnecting from all access networks sent by the UE is received, a tracking area identity sent by the UE is received. When the UE is in an idle state, after receiving the tracking area identity sent by the UE, if the application server determines to page the UE, the application server queries, in a locally stored mapping list according to the received tracking area identity, one or more access network device identities corresponding to the tracking area identity, and sends a paging message to an access network device corresponding to the one or more access network device identities. The mapping relationship table includes a mapping relationship between a tracking area identity and an access network device identity, and the access network device identity is an IP address of an access network device or another identity.

Further, when the UE is in an idle state, if the UE is moved from one tracking area to another tracking area, the UE initiates a tracking area update procedure to the application server, so as to report, to the application server, an access network device identity and/or a tracking area identity updated by the UE. The access network device identity is an IP address of an access network device, or an ID of a base station, or another identity. Optionally, the application server may periodically receive, by using a heartbeat message, a current tracking area identity corresponding to the UE that is sent by the UE.

Figure 8A:
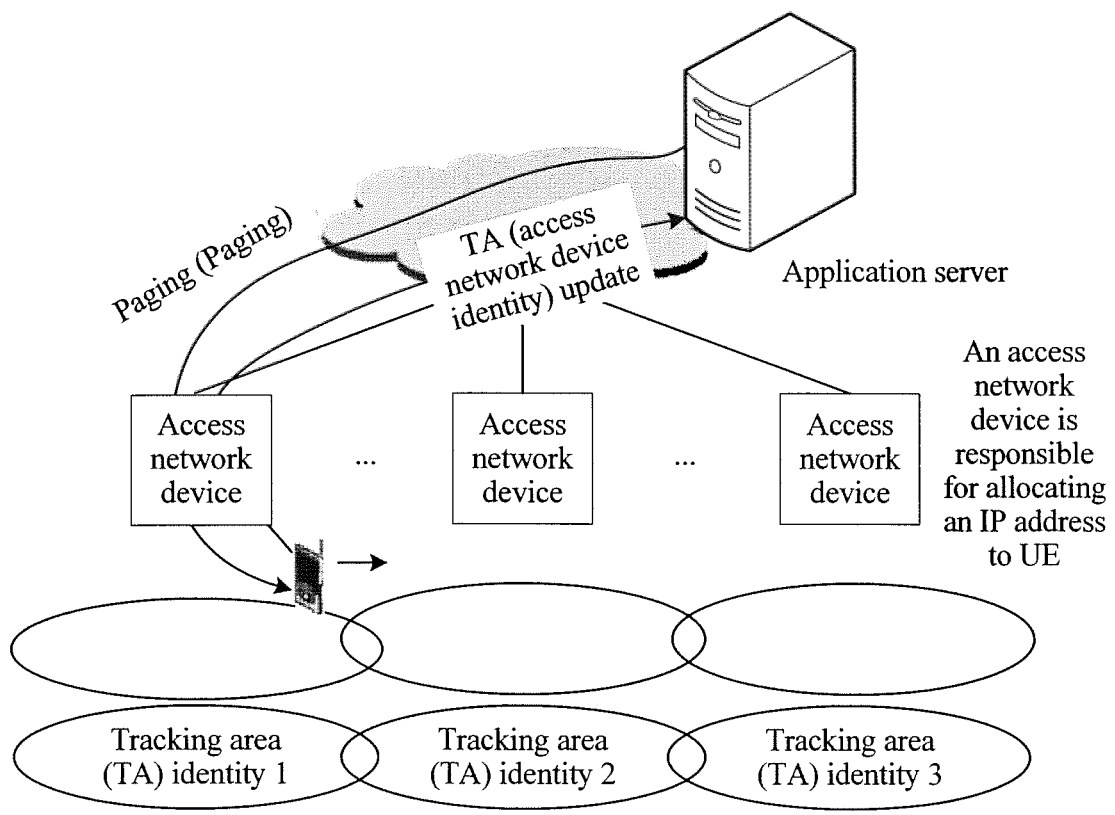
FIG. 8a and FIG. 8b are schematic diagrams of a track area to which an access network device belongs according to an embodiment of the present invention.
Figure 8B:
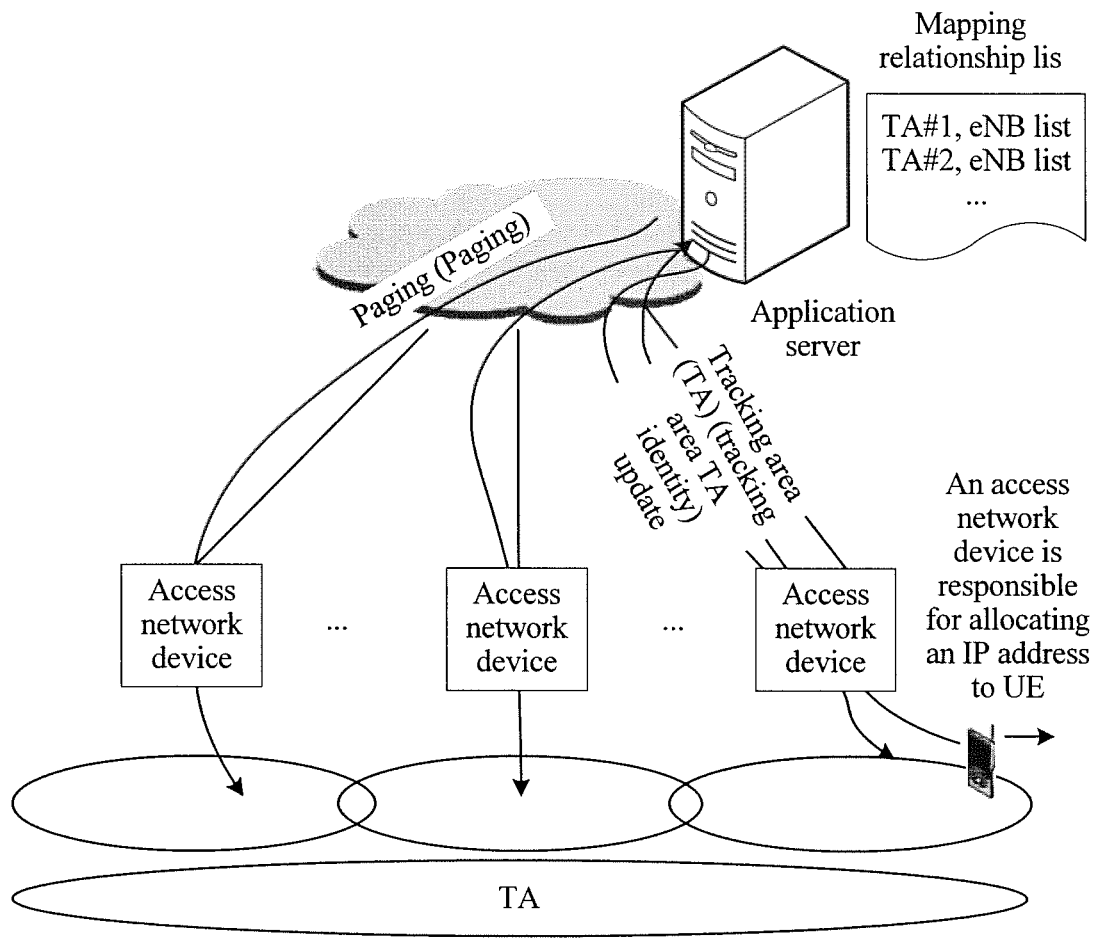

In the foregoing process, when the UE accesses multiple access networks, an access network device corresponding to each access network belongs to a tracking area. Referring to FIG. 8a, different access network devices may belong to different tracking areas; for example, a tracking area to which an access network device 1 belongs is TA1, and a tracking area to which an access network device 2 belongs is TA2. Referring to FIG. 8b, different access network devices may belong to a same tracking area; for example, both a tracking area to which an access network device 1 belongs and a tracking area to which an access network device 2 belongs are TA1. When different access network devices belong to a same tracking area, if the application server needs to page the UE, a paging message needs to be sent to each access network device corresponding to a tracking area identity of the UE. By using the technical solution, because multiple access network devices belong to a same tracking area, a quantity of times of updating a tracking area is reduced, and energy consumption of the UE is reduced. When different access network devices belong to different tracking areas, if the application server needs to page the UE, a paging message needs to be sent to an access network device corresponding to a tracking area identity of the UE. By using the technical solution, the application server needs to send the paging message only to the access network device corresponding to the tracking area identity of the UE, and a quantity of times of signaling interaction is less than a quantity of times of signaling interaction occurring when different access network devices belong to a same tracking area.

Optionally, when the UE is in a coverage area of the macro base station, the application server may send a paging message only to the macro base station, and does not need to send a paging message to an access point device managed by the macro base station, so as to reduce signaling interaction, and reduce a system overhead.

By using the technical solution, an application server manages a tracking area identity corresponding to UE, and a mapping relationship between the tracking area identity and each access network device identity. When the UE is in an idle state, the application server can page the UE according to the locally stored tracking area identity corresponding to the UE and a locally stored table of a mapping relationship between the tracking area identity and each access network device identity, so that the UE switches from the idle state to a connected state, and incoming call accessibility of the UE is implemented.

Figure 9:
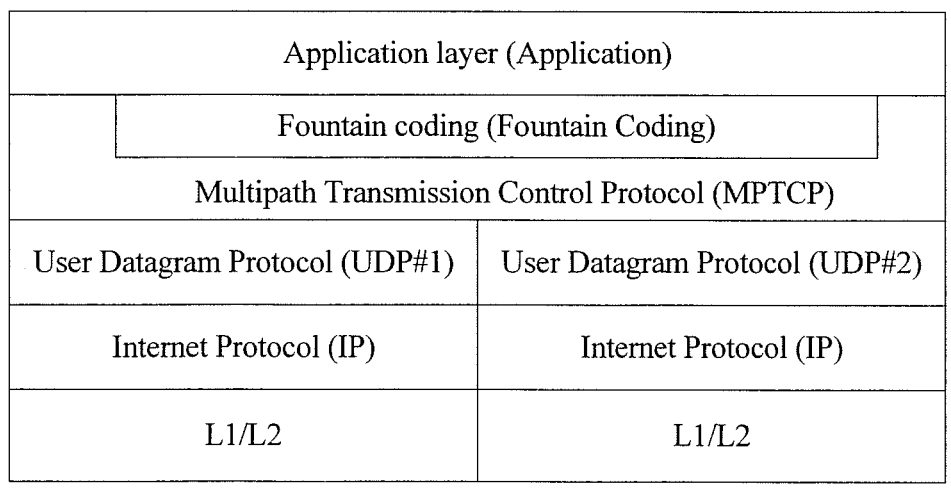
FIG. 9 is a schematic diagram of a protocol stack corresponding to an application server according to an embodiment of the present invention.

Optionally, referring to FIG. 9, FIG. 9 is a schematic diagram of a protocol stack corresponding to the application server according to this embodiment of the present invention. An aggregation layer of the application server is a TCP layer, and a highest protocol layer of all branches corresponding to different links is UDP. When the data transmission service is downlink data transmission, a process in which the application server provides the data transmission service for the UE by using the at least two IP addresses specifically includes: sending, by the application server, downlink data to a local MPTCP entity for processing; sending, by the MPTCP entity according to a distribution algorithm (for example, a distribution proportion is determined according to data transmission rates of links corresponding to different UDP/IP entities), processed downlink data to different UDP/IP entities in the application server respectively for processing; sending, by the different UDP/IP entities, processed downlink data to the UE by using access networks corresponding to the corresponding IP addresses; and receiving, by the application server, first reception success acknowledgement information sent by an MPTCP entity in the UE. For example, when the UE has a first IP address and a second IP address, the application server sends downlink data to the UE by using the first IP address and the second IP address as destination IP addresses. The MPTCP entity in the application server processes the downlink data, and sends processed downlink data to a first UDP/IP entity in the application server and a second UDP/IP entity in the application server respectively according to a distribution algorithm. The first UDP/IP entity in the application server processes first downlink data in the downlink data, and the second UDP/IP entity in the application server processes second downlink data in the downlink data. The first UDP/IP entity in the application server sends, to the application server by using an access network corresponding to the first IP address, the first downlink data whose destination IP address is the first IP address, and the second UDP/IP entity in the application server sends, to the UE by using an access network corresponding to the second IP address, the second downlink data whose destination IP address is the second IP address.

Optionally, the downlink data that is sent to the different UDP/IP entities in the application server for processing is a fountain coding data block.

Optionally, a process in which the application server receives the first reception success acknowledgement information sent by the MPTCP entity in the UE specifically includes: receiving, by the application server, a first MPTCP status report sent by the MPTCP entity in the UE, where the first MPTCP status report includes an identity of one or more fountain coding source data blocks and information about whether reception is successful, or includes a quantity of fountain coding data blocks that have been successfully received separately for one or more fountain coding source data blocks, or includes a quantity of fountain coding data blocks that further need to be successfully received separately for one or more fountain coding source data blocks, and the fountain coding data block is generated by encoding the fountain coding source data block. In the foregoing process, the first reception success acknowledgement message is the first MPTCP status report.

Further, the application server determines, according to the first MPTCP status report, a fountain coding data block that needs to be transmitted to the UE.

Optionally, if a speed of transmitting downlink data on any link corresponding to the UE is less than a preset threshold, the MPTCP entity in the application server stops distributing downlink data to the any link or reduces downlink data distributed to the any link for transmission, and distributes more downlink data, for transmission, to any remaining one or more links except the any link in all links corresponding to the UE.

By using the technical solution, a fountain coding technology is used to transmit downlink data, fountain coding data may be distributed from a link with a relatively low transmission speed to a link with a relatively high transmission speed, and there is neither a need to retransmit, on the link to which the fountain coding data is distributed, data that is successfully transmitted on the link from which the fountain coding data is distributed, nor a need to retransmit, on the link to which the fountain coding data is distributed, downlink data that is unsuccessfully transmitted on the link from which the fountain coding data is distributed, so as to greatly reduce complexity of processing data by the application server during distribution between links.

Optionally, referring to the schematic diagram of the protocol stack corresponding to the application server shown in FIG. 9, when the data transmission service is uplink data transmission, a process in which the application server provides the data transmission service for the UE by using the at least two IP addresses specifically includes: receiving, by the application server, uplink data that is sent by the UE by using the at least two IP addresses as source IP addresses; sending the uplink data of the different source IP addresses to different local IP/UDP entities respectively, where one IP/UDP entity is corresponding to one IP address; processing, by all the IP/UDP entities that receive the uplink data corresponding to the different IP addresses, the corresponding uplink data respectively; aggregating, at a local MPTCP entity, the uplink data processed by the IP/UDP entities; and when a preset condition of the application server is met, sending, by the MPTCP entity in the application server, second reception success acknowledgement information to the UE. For example, when the UE has a first IP address and a second IP address, and when the application server sends uplink data to the UE by using both the first IP address and the second IP address, first uplink data corresponding to the first IP address is sent to a first IP/UDP entity in the application server, and second uplink data corresponding to the second IP address is sent to a second IP/UDP entity in the application server. The first IP/UDP entity in the application server processes the first uplink data, and the second IP/UDP entity in the application server processes the second uplink data. The first IP/UDP entity in the application server sends processed first uplink data to an MPTCP entity in the application server, and the second IP/UDP entity in the application server sends processed second uplink data to the MPTCP entity in the application server.

Optionally, the uplink data processed by the different IP/UDP entities in the application server is a fountain coding data block.

Optionally, when the preset condition of the application server is met, a process in which the MPTCP entity in the application server sends the second reception success acknowledgement information to the UE specifically includes: when determining that one or more fountain coding source data blocks are successfully obtained by means of decoding, sending, by the application server, a second MPTCP status report to the UE; or sending, by the application server, a second MPTCP status report to the UE according to a preset period, where the second MPTCP status report includes an identity of one or more fountain coding source data blocks and information about whether the one or more fountain coding source data blocks are successfully received, or includes information about how many fountain coding data blocks that have been successfully received separately for one or more fountain coding source data blocks, or includes information about how many fountain coding data blocks that further need to be successfully received separately for one or more fountain coding source data blocks, and the fountain coding data block is generated by encoding the fountain coding source data block. In the foregoing process, that the application server determines that the one or more fountain coding source data blocks are successfully obtained by means of decoding is used as a trigger condition, or another trigger condition may be preset. When the trigger condition is met, the application server sends the first MPTCP status report to the UE, and a specific trigger condition is determined by a user according to a specific situation. In the foregoing process, the second reception success acknowledgement message is the second MPTCP status report.

Further, the UE determines, according to the second MPTCP status report, a fountain coding data block that needs to be transmitted to the application server.

Optionally, if a speed of transmitting uplink data on any link corresponding to the UE is less than a preset threshold, the local MPTCP entity in the UE stops distributing uplink data to the any link or reduces uplink data distributed to the any link, and distributes more uplink data, for transmission, to any remaining one or more links except the any link in all links corresponding to the UE.

By using the technical solution, a protocol stack of an application server is modified. After successfully decoding at least one fountain coding source data, UE sends second reception success acknowledgement information to the application server, so as to avoid a problem, caused by a congestion control mechanism of a TCP layer when a highest protocol layer of all branches in the existing application server is the TCP layer, that TCP ACK feedback needs to be performed each time a data packet is successfully transmitted, effectively improve a throughput of a wireless communications network, improve an overall transmission rate, and effectively reduce energy consumption of the application server. In addition, when a fountain coding technology is used to transmit uplink data, a fountain coding data block may be distributed from a link with a relatively low transmission speed to a link with a relatively high transmission speed, and there is neither a need to retransmit, on the link to which the data block is distributed, data that is successfully transmitted on the link from which the data block is distributed, nor a need to retransmit, on the link to which the data block is distributed, uplink data that is unsuccessfully transmitted on the link from which the data block is distributed, so as to greatly reduce complexity of processing data by the UE during distribution between links.

Optionally, before the UE transmits the fountain coding data block to the application server, the application server sends fountain coding capability supportive information of the application server to the UE; and receives a fountain code coding/decoding related configuration parameter of the application server that is generated by the UE according to the fountain coding capability supportive information of the application server. The fountain code coding/decoding related configuration parameter of the application server includes one or any combination of the following: information such as a quantity of fountain coding data blocks included in one fountain coding source data block, a size of storage space occupied by one fountain coding data block, a period of sending the second MPTCP status report, and a trigger condition of the second MPTCP status report. The fountain coding capability supportive information of the application server includes: whether the application server has a capability of generating a fountain coding data block, and whether the application server has a capability of decoding a fountain coding data block.

In the technical solution of the present invention, because the wireless communications network may include multiple application servers, different application servers may be corresponding to different service providers, and there is a problem that application servers corresponding to different service providers cannot communicate with each other. Based on the technical problem, optionally, a standard interface is defined or an Interworking Protocol is subscribed between the application servers corresponding to the different service providers, so as to implement communication between the application servers corresponding to the different service providers.

Figure 10:
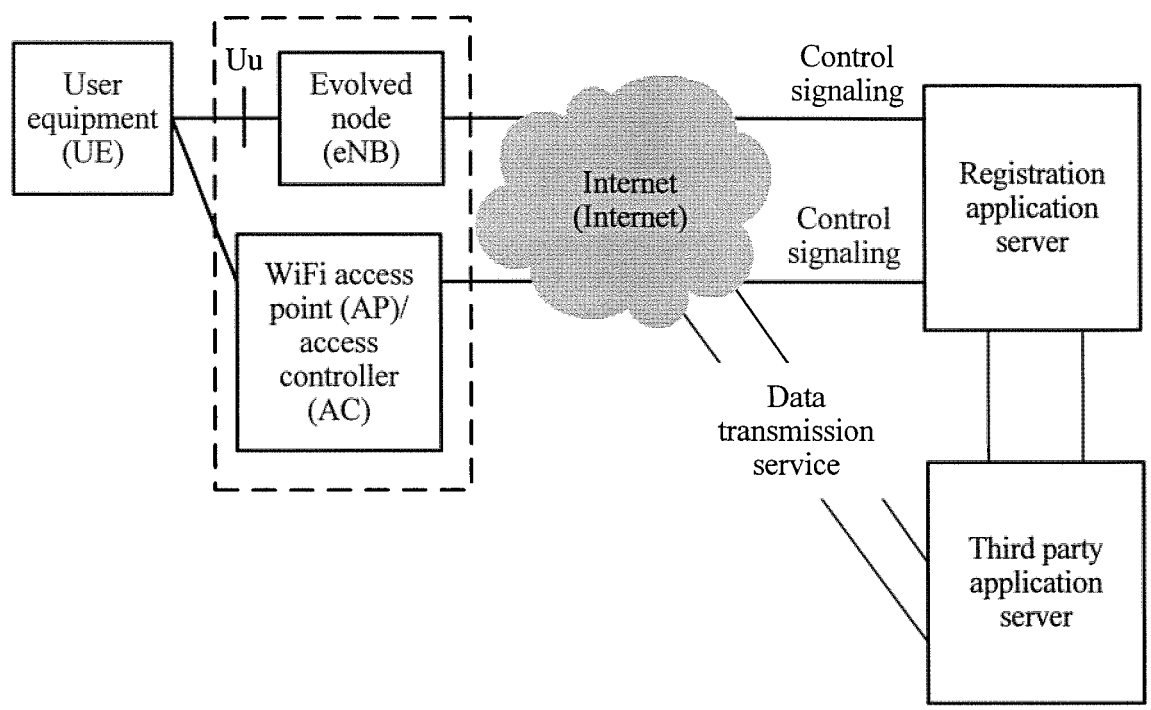
FIG. 10 is a second schematic diagram of a wireless communications network architecture according to an embodiment of the present invention.

In the solution, the application server that provides a data transmission service for the UE and an application server with which the UE is registered are a same server. Further, in the technical solution of the present invention, an application server that actually provides a data transmission service for the UE may be different from an application server of an operator with which the UE is registered. The application server may be an application server of another operator, or may be an application server of another application provider, and is referred to as a third party application server herein. Correspondingly, the application server of the operator with which the UE is registered is referred to as a registration application server. In this case, referring to FIG. 10, all control signaling is still transmitted between the registration application server and the UE, for example, a report of adding and removing an IP address, and a user-plane data transmission process is directly performed between the third party application server and the UE. The protocol stack corresponding to the application server shown in FIG. 9 is implemented in the third party application server, and corresponding data processing and a corresponding MPTCP status report are also implemented in the third party application server. Data transmission between the UE and the third party application server is directly performed by using all available access networks without a need of the registration application server. Uplink data transmission is used as an example. After reaching the access network device, uplink data that needs to be transmitted by the UE is directly sent to the third party application server instead of first reaching the registration application server and then reaching the third party application server. To implement direct data transmission between the access network device and the third party application server, the registration application server needs to serve as a control bridge, and when an available access network increases and decreases, notifies identities such as IP addresses or MAC addresses of the access network device and the third party application server to the access network device or the third party application server, and further needs to perform a verification operation on identity validity of the access network device and the third party application server. At the same time, the registration application server may further provide service quality related information, or the like, for the third party application server. An end user uses the registration application server as an access entry to obtain a service provided by the third party application server, such as Microblog and WeChat.

By using the technical solution of the present invention, devices such as an MME, an S-GW, a PDN-GW, a PCRF, and an HSS in an existing core network are deleted, and an application server is used as a portal of communication. An access network is directly connected to the application server by using the Internet Cloud, so that super-flattening of a wireless communications network is implemented. In addition, the application server allocates necessary functions such as accounting and authentication. An access network device implements an IP address allocation function. A brand-new function division and a fountain coding technology are used to ensure mobility of UE and quality of communication between devices in the wireless communications network. In addition, a fountain coding technology is used at an MPTCP entity and a TCP layer of a transmit end, so that when uplink and downlink data transmission is performed, complexity of a data distribution procedure and data processing is reduced, and service continuity of the UE is implemented.

A procedure of communication between UE, an access network device, and an application server is described in detail in the following with reference to specific application scenarios.

Application Scenario 1

Figure 11:
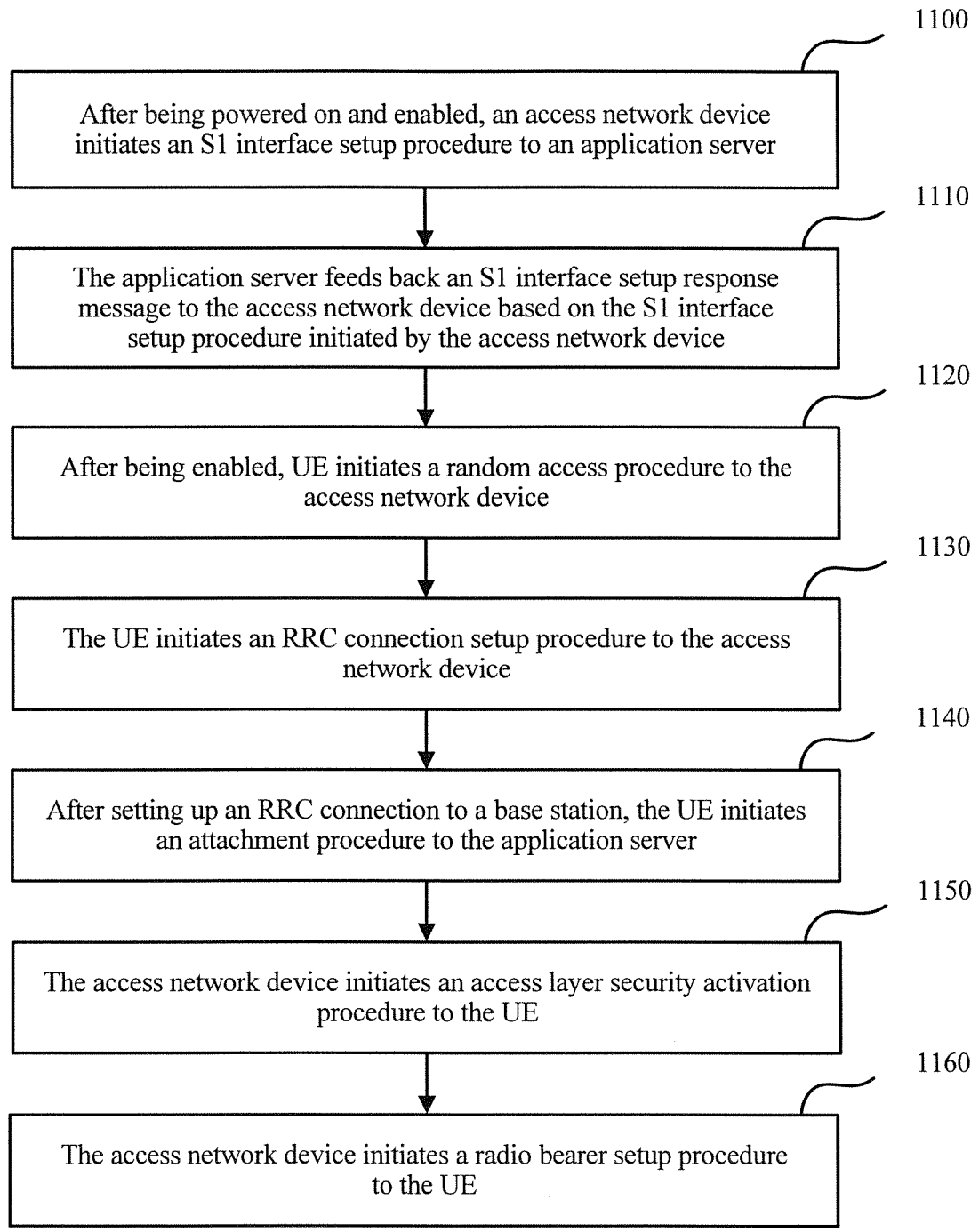
FIG. 11 is a flowchart of accessing an application server by UE in a specific application scenario according to an embodiment of the present invention.

Based on a super-flattened wireless communications network provided in the present invention, referring to FIG. 11, a procedure in which UE accesses an application server is described in detail by using an example in which an access network in the wireless communications network is an LTE cellular network.

Step 1100: After being powered on and enabled, an access network device initiates an S1 interface setup procedure to the application server.

In this embodiment of the present invention, the access network device may reuse an S1 interface setup request (S1 setup Request) message between an eNB and an MME in an existing LTE protocol, and the S1 interface setup request message includes at least one of an access network device identity, an identity of a tracking area to which the access network device belongs, an identity of a PLMN to which the access network device belongs, or the like. The access network device identity may be an IP address of the access network device.

Step 1110: The application server feeds back an S1 interface setup response message to the access network device based on the S1 interface setup procedure initiated by the access network device.

In this embodiment of the present invention, after receiving the S1 interface setup request message sent by the access network device, the application server feeds back the S1 interface setup response (S1 Setup Response) message to the access network device according to the S1 interface setup request message. The application server may input decisions such as subsequent data distribution according to information carried in the S1 interface setup request message such as the access network device identity, the identity of the tracking area to which the access network device belongs, and the identity of the PLMN to which the access network device belongs.

Step 1120: After being enabled, the UE initiates a random access procedure to the access network device.

In this embodiment of the present invention, after being enabled, completing downlink synchronization with the access network device, and obtaining system information, the UE initiates a random access procedure (Random Access Procedure) so as to access a cellular network corresponding to the access network device. The system information is a bandwidth resource that can be scheduled by the access network device.

Step 1130: The UE initiates an RRC connection setup procedure to the access network device.

In this embodiment of the present invention, when the access network device detects that there is a resource that can be scheduled, the UE initiates a radio resource control (Radio Resource Control, RRC) connection setup procedure (RRC connection setup procedure) to the access network device.

Optionally, the RRC connection setup procedure is a three-handshake procedure: The UE sends an RRC connection request (RRC connection request) message to the access network device; the access network device sends an RRC connection setup (RRC connection setup) message to the UE based on the RRC connection request message; the UE feeds back an RRC connection setup complete (RRC connection setup complete) message to the access network device according to the RRC connection setup message, so that setup of an RRC connection between the UE and the access network device is completed. The access network device generally adds, to the RRC connection setup message, an IP address allocated to the UE. The access network device may send, to the UE by using another message, an IP address allocated to the UE, which is not limited herein. However, the UE determines that the IP address allocated by the access network device is obtained before an attachment procedure is initiated to the application server.

Step 1140: After setting up an RRC connection to a base station, the UE initiates an attachment procedure to the application server.

In this embodiment of the present invention, the UE initiates the attachment procedure (Attachment Procedure) to the application server, and the attachment procedure is a three-handshake procedure: The UE sends an attach request (Attach request) message to the application server; the application server generates attach accept (Attach Accept) message according to the attach request message and sends the attach accept message to the UE; the UE feeds back an attach complete (Attach complete) message to the application server according to the attach accept message, so that the attachment procedure that is of the UE and is on the application server is completed. The attach request message may be carried in the RRC connection setup complete (RRC connection setup complete) message and is forwarded by the access network device to the application server.

Optionally, in the three-handshake attachment procedure, the UE further sends, to the application server, the IP address that is allocated by the access network device to the UE and a user identity, so that the application server verifies, according to the user identity, whether a user is valid, that is, the application server performs authentication on the UE. The user identity may be information, such as a user's name or a password, corresponding to the application server, or may be information such as a USIM and SIM. An authentication manner may be an EAP-AKA manner. In addition, in the three-handshake attachment procedure, procedures such as key derivation and distribution between the UE and the application server may also be included.

Step 1150: The access network device initiates an access layer security activation procedure to the UE.

In this embodiment of the present invention, the access network device obtains a preset key or a key derived by the application server, and sends the key or a parameter (for example, an NCC, Next-Hop Chaining Counter, next-hop chaining counter) related to the key to the UE in the security activation procedure (AS Security Activation), so that the UE performs communication according to the key or the parameter related to the key.

In the foregoing process, there is no sequence between step 1150 and step 1140. That is, step 1140 may be performed first, and step 1150 is then performed, or step 1150 may be performed first, and step 1140 is then performed, or step 1140 and step 1150 may be performed in parallel.

Step 1160: The access network device initiates a radio bearer setup procedure to the UE.

In this embodiment of the present invention, the access network device sets up a default bearer at an interface and configures a related parameter (for example, a priority of a logical channel of a bearer) for the UE in the radio bearer setup procedure (RB establishment).

Figure 12:
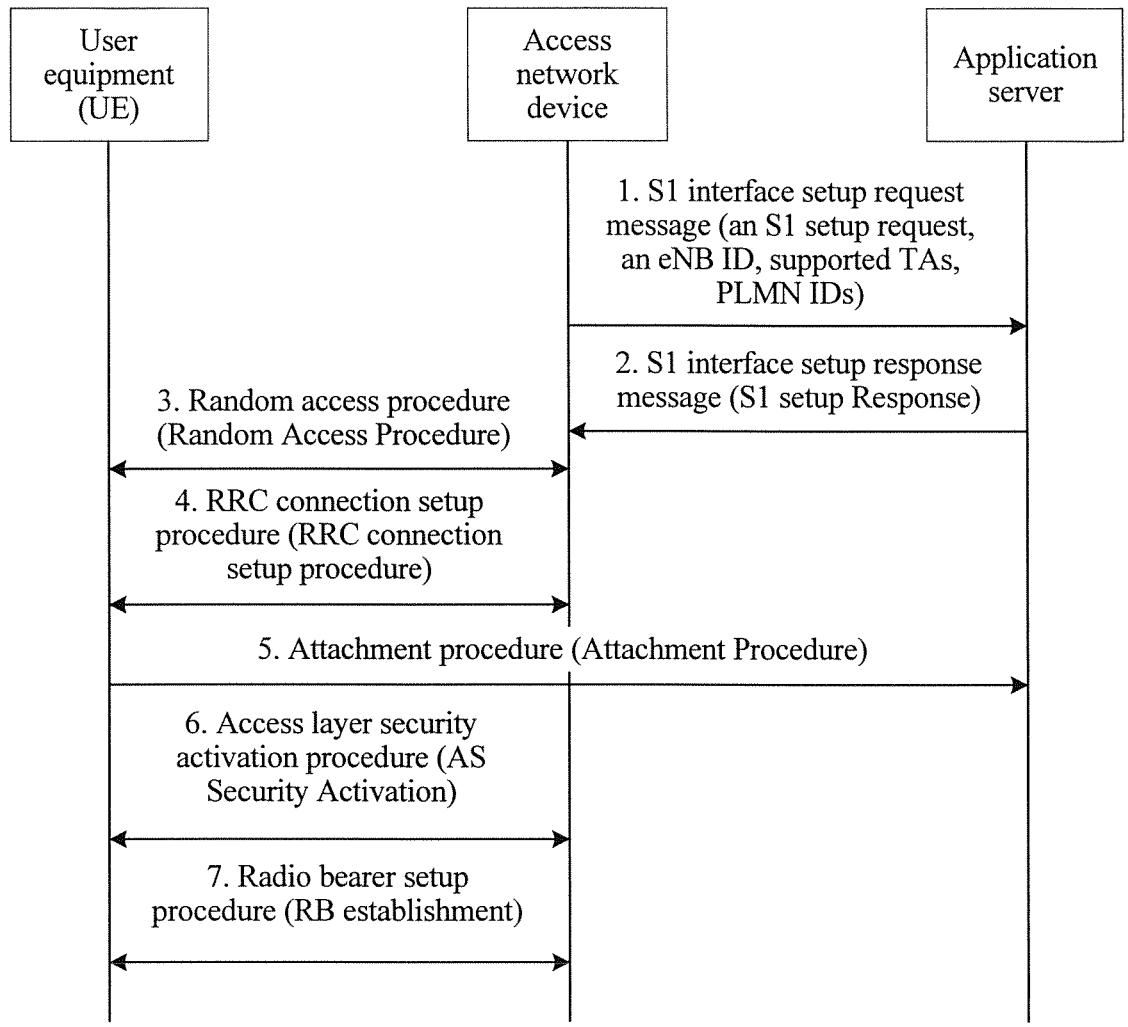
FIG. 12 is a schematic diagram of signaling interaction of accessing an application server by UE in a specific application scenario according to an embodiment of the present invention.

Based on the process in which the UE accesses the application server, referring to FIG. 12, FIG. 12 is a schematic diagram of signaling interaction of accessing the application server by the UE according to an embodiment of the present invention. A specific process of signaling interaction is as follows: The access network device sends an S1 setup Request to the application server; the application server sends an S1 Setup Response to the access network device; the UE initiates a Random Access Procedure to the access network device; the UE initiates an RRC connection setup procedure to the access network device; the UE initiates an Attachment Procedure to the application server;

the access network device initiates AS Security Activation to the UE; and the access network device initiates RB establishment to the UE.

In the process in which the UE accesses the application server, signaling stipulated in an existing protocol of LTE may be reused in signaling interaction between devices, so as to reduce impact on the UE and the access network device. In practical application, corresponding functions are implemented by using various types of signaling provided in the foregoing embodiment, or the functions may be implemented by using another message stipulated in an LTE protocol, which is not limited herein. In addition, in the process in which the UE accesses the application server, the UE starts, when being enabled, to access a cellular network corresponding to the access network device. A process from step 1120 is also applicable to an access scenario in which the UE that already has a UE-to-application server link accesses the cellular network corresponding to the access network device to form another link that connects to the application server, and is also applicable to a scenario in which the UE switches from an idle state to a connected state and is connected to the application server by using the cellular network corresponding to the access network device.

By using the technical solution, an access network device allocates an IP address to UE, and an application server provides a data transmission service for the UE by using the access network device. When communication quality of a wireless communications network is ensured, super-flattening of the wireless communications network is implemented, and a delay of data transmission between devices in the wireless communications network is effectively reduced.

Application Scenario 2

Figure 13:
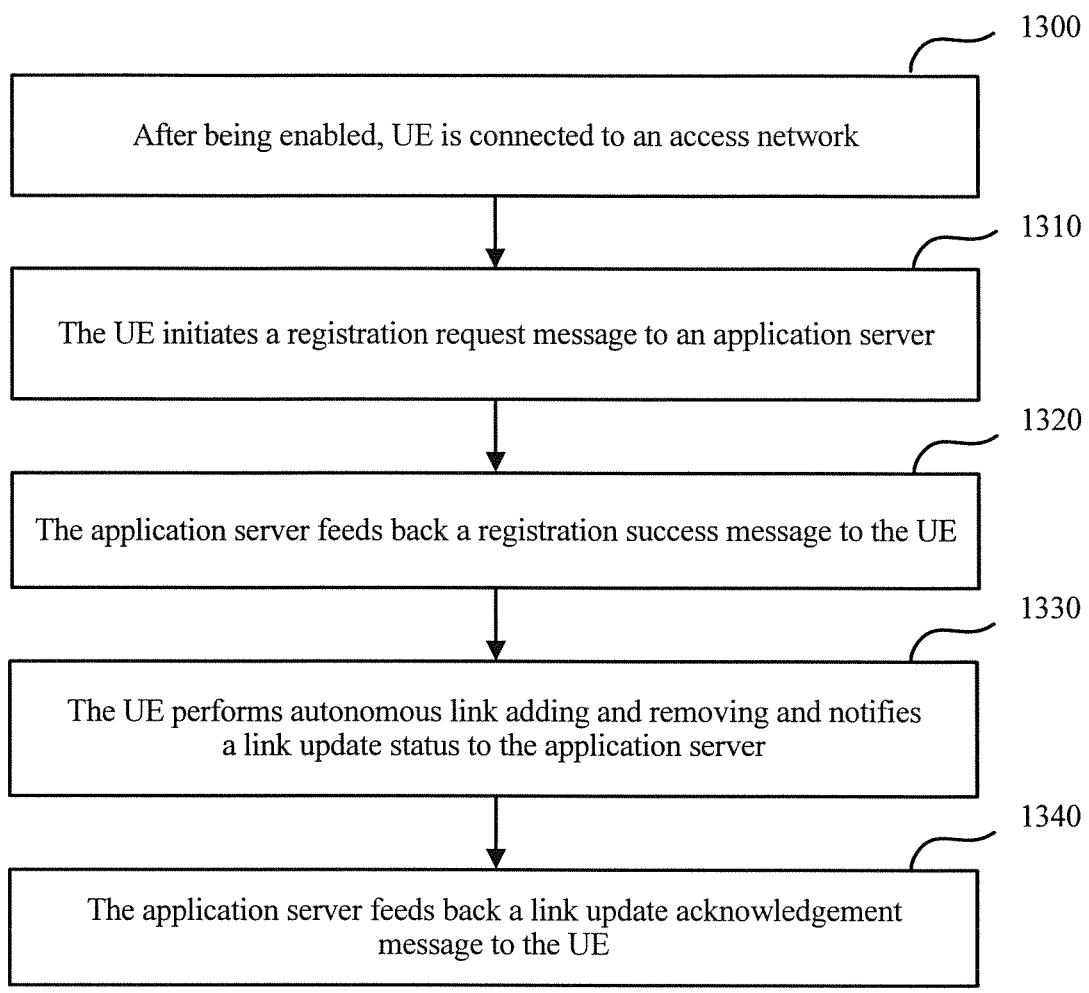
FIG. 13 is a flowchart of performing link updating by UE in a specific application scenario according to an embodiment of the present invention.

Based on a super-flattened wireless communications network provided in the present invention, referring to FIG. 13, a procedure in which UE in a connected state performs autonomous scanning and link adding and removing is described in detail by using an example in which an access network in the wireless communications network is an LTE cellular network.

Step 1300: After being enabled, the UE is connected to an access network.

In this embodiment of the present invention, after the UE is enabled, an available access network is scanned. After an accessible access network that meets a preset rule is detected, the accessible access network that meets the preset rule is accessed. The preset rule is a rule preset according to a specific application scenario. The preset rule includes a rule of a priority of selecting an access network, a channel quality threshold, or the like. The preset rule is stipulated in a protocol, or is stipulated in configuration information of the UE, or is stipulated in a corresponding policy of an application server.

Optionally, after accessing the access network, the UE obtains an IP address corresponding to the access network.

Step 1310: The UE initiates a registration request message to an application server.

In this embodiment of the present invention, when the access network accessed by the UE is a non-cellular network, the UE sends the registration request message to the application server. The registration request message includes all IP addresses that the UE has and a user identity. The application server uses the IP addresses that the UE has as destination IP addresses, and provides a data transmission service for the UE by using each IP address.

Further, before initiating the registration request message to the application server, the UE may access multiple access networks. In this case, the registration request message may include multiple IP addresses.

Optionally, the application server verifies, according to a user identity carried in the registration request, whether a user is valid. An access network device identity is an IP address of an access network device or another identity. When the application server verifies that the user corresponding to the UE is valid, the application server provides various data transmission services for the UE, for example, a web browsing service, a video play service, a call service, and an SMS transceiver service.

Step 1320: The application server feeds back a registration success message to the UE.

In this embodiment of the present invention, the application server feeds back the registration success message to the UE. The registration success message may include a key used when the application server communicates with the UE and/or policy information that instructs the UE to perform autonomous link scanning and link adding and removing. In addition, the policy information for the UE to perform autonomous link scanning and link adding and removing may be obtained by means of local preconfiguration in the UE, and the policy information for autonomous link scanning and link adding and removing includes a condition (for example, scanning is performed according to a preset air interface channel quality threshold) that is met when the UE performs access network scanning and a condition that an access network accessed by the UE should meet.

Step 1330: The UE performs autonomous link adding and removing and notifies a link update status to the application server.

Figure 14A:
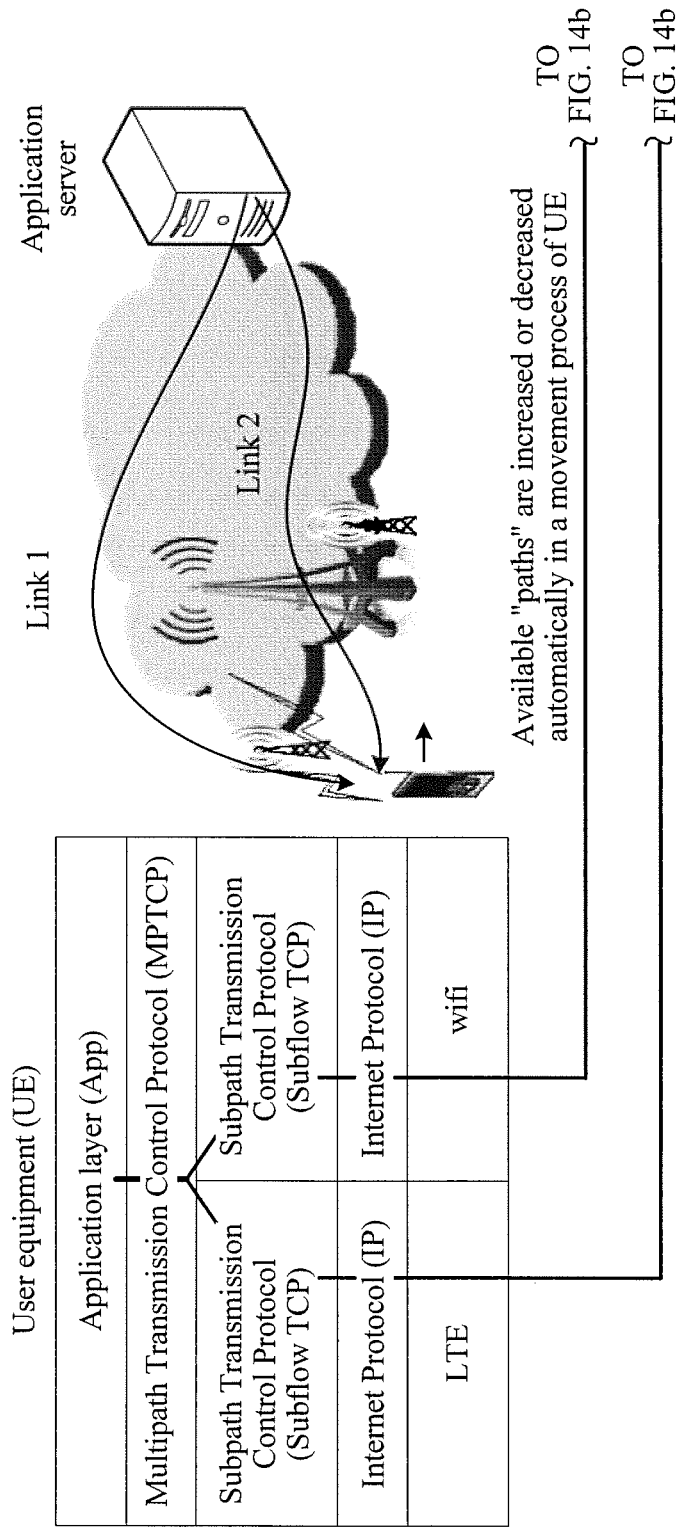
FIG. 14a and FIG. 14b is a schematic diagram of a wireless communications network architecture in which UE performs link updating in a specific application scenario according to an embodiment of the present invention.
Figure 14B:
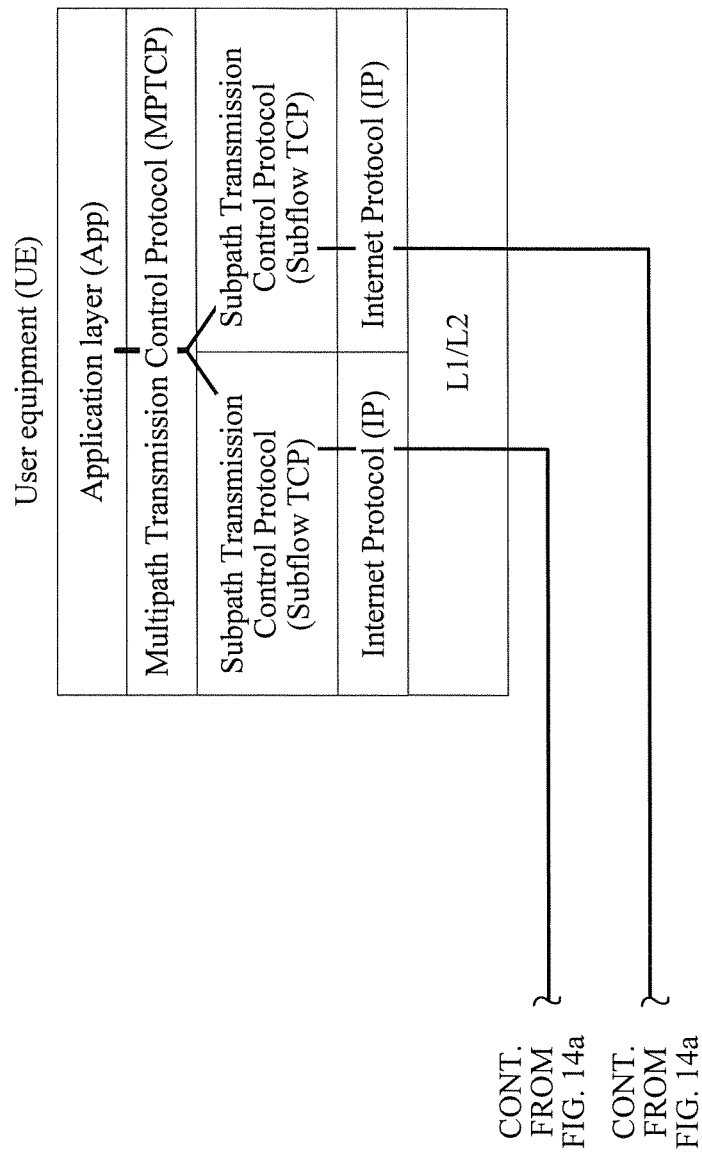

In this embodiment of the present invention, referring to FIG. 14*a* and FIG. 14*b*, the UE performs link adding and removing based on the policy information for autonomous link scanning and link adding and removing, and notifies the link change status to the application server, that is, the UE needs to notify a newly added IP address or a deleted IP address to the application server.

Optionally, when deleting an existing IP address, the UE disconnects from an access network corresponding to the IP address, and notifies the deleted IP address and information about disconnecting from the access network corresponding to the deleted IP address to the application server in an explicit manner or in an implicit manner.

Optionally, a specific process in which the UE performs link adding includes: when the UE accesses a new access network (for example, an independent WiFi network) according to the policy information for autonomous link scanning and link adding and removing, obtaining, by the UE, an IP address corresponding to the new access network and notifying the IP address to the application server.

Optionally, the processes in which the UE performs link adding and removing may be controlled by a macro base station. When the processes are controlled by the macro base station, if the UE has accessed the macro base station, and the UE autonomously adds a specific access point in coverage of the macro base station as a link, the specific access point notifies access information of the UE to the macro base station. The macro base station provides a data transmission service for the UE by using the specific access point as an offloading site by using an MSA technology. Because the IP address of the UE has been allocated by the macro base station, the specific access point does not need to allocate a new IP address to the UE. In this way, the specific access point is invisible to the application server, the macro base station distributes some downlink data to the specific access point, and the macro base station receives uplink data of the specific access point and forwards the uplink data to the application server.

Step 1340: The application server feeds back a link update acknowledgement message to the UE.

In this embodiment of the present invention, after receiving the IP address that is no longer used and is sent by the UE, and the information about disconnecting from the access network corresponding to the IP address, or the newly added IP address, the application server processes the information sent by the UE, and generates a link update acknowledgement message and sends the link update acknowledgement message to the UE. After receiving the link update acknowledgement message, the UE may determine that the application server has learned an IP address corresponding to an access network currently available to the UE.

Further, when the application server receives the deleted IP address and the information about disconnecting from the access network corresponding to the deleted IP address, the application server no longer uses the deleted IP address to provide a data transmission service for the UE, where the deleted IP address and the information about disconnecting from the access network corresponding to the deleted IP address are sent by the UE in an explicit manner or in an implicit manner.

Optionally, the application server enables a local MPTCP function, uses each IP address that the UE has as a destination IP address, and provides a data transmission service for the UE by using each IP address.

By using the technical solution, an access network device allocates an IP address to UE, the UE is directly connected to an application server by using the access network device (for example, a macro station/a micro station/a WiFi AP), and super-flattening of a wireless communications network is implemented. In addition, there is no independent switching procedure between access network devices. An MPTCP entity in the UE performs link adding and removing, and an APP entity in the UE implements a differentiated service (for example, differentiated setting of a TCP/IP parameter) between users/services, so that service continuity of the UE in a connected state is ensured.

Application Scenario 3

Figure 15:
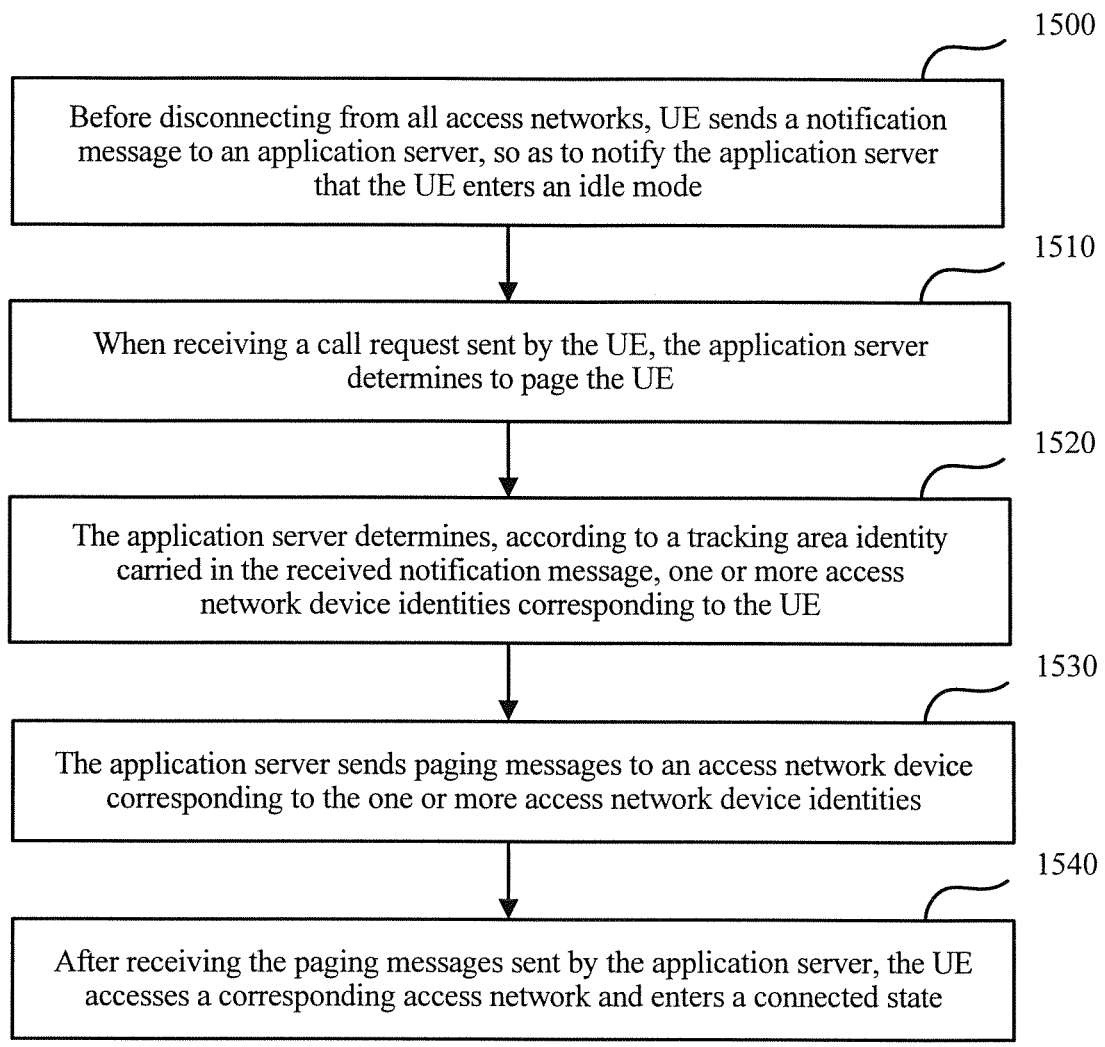
FIG. 15 is a flowchart of switching, by UE, from an idle state to a connected state in a specific application scenario according to an embodiment of the present invention.

Based on a super-flattened wireless communications network provided above, referring to FIG. 15, a procedure in which UE in an idle state switches to a connected state is described in detail by using an example in which an access network in the wireless communications network is an LTE cellular network.

Step 1500: Before disconnecting from all access networks, the UE sends a notification message to an application server, so as to notify the application server that the UE enters an idle state.

In this embodiment of the present invention, the notification message further includes an identity of a tracking area to which an access network device belongs and/or an access network device identity, where the access network device is corresponding to an access network on which the UE currently camps. The notification message may be a heartbeat message.

Optionally, referring to FIG. 8*a* and FIG. 8*b*, each access network device has a tracking area (TA) to which the access network device belongs. Different access network devices may belong to different tracking areas; for example, a tracking area to which an access network device 1 belongs is TA1, and a tracking area to which an access network device 2 belongs is TA2. Different access network devices may belong to a same tracking area; for example, both a tracking area to which an access network device 1 belongs and a tracking area to which an access network device 2 belongs are TA1. Each access network device broadcasts the identity of the tracking area to which the access network device belongs. After entering the idle state, the UE receives a tracking area identity broadcast by an access network device corresponding to each IP address that the UE has. The access network device that broadcasts the identity of the tracking area to which the access network device belongs is a macro base station or an independent WiFi network device.

Optionally, the UE in the connected state may receive a tracking area identity broadcast by an access network.

Step 1510: When receiving a call request sent by the UE, the application server determines to page the UE.

Step 1520: The application server determines, according to a tracking area identity carried in the received notification message, one or more access network device identities corresponding to the UE.

In this embodiment of the present invention, the application server locally stores a mapping relationship table, and the mapping relationship table includes a mapping relationship between a tracking area identity and an access network device identity. When the call request of the UE is received, it is determined to page the UE, and the one or more access network device identities corresponding to the tracking area identity are queried in the locally stored mapping table according to the received tracking area identity.

Optionally, when a tracking area corresponding to the UE in the idle state is changed because of movement of the UE, a tracking area update procedure needs to be initiated to the application server, that is, an identity of an updated tracking area is notified to the application server. The application server updates a locally stored tracking area identity corresponding to the UE according to the identity of the updated tracking area. The UE may periodically send, to the application server by using a heartbeat message, a current tracking area identity corresponding to the UE.

Step 1530: The application server sends paging messages to an access network device corresponding to the one or more access network device identities.

Step 1540: After receiving the paging messages sent by the application server, the UE accesses a corresponding access network and enters a connected state.

By using the technical solution, an application server manages a tracking area identity corresponding to UE, and a mapping relationship between the tracking area identity and each access network device identity. When the UE is in an idle state, the application server updates a locally stored tracking area identity corresponding to the UE according to an updated tracking area identity reported by the UE. In addition, the application server can page the UE according to the locally stored tracking area identity corresponding to the UE and a table of the mapping relationship between the tracking area identity and each access network device identity, so that the UE switches from the idle state to a connected state, and incoming call accessibility of the UE is implemented.

Application Scenario 4

Figure 16:
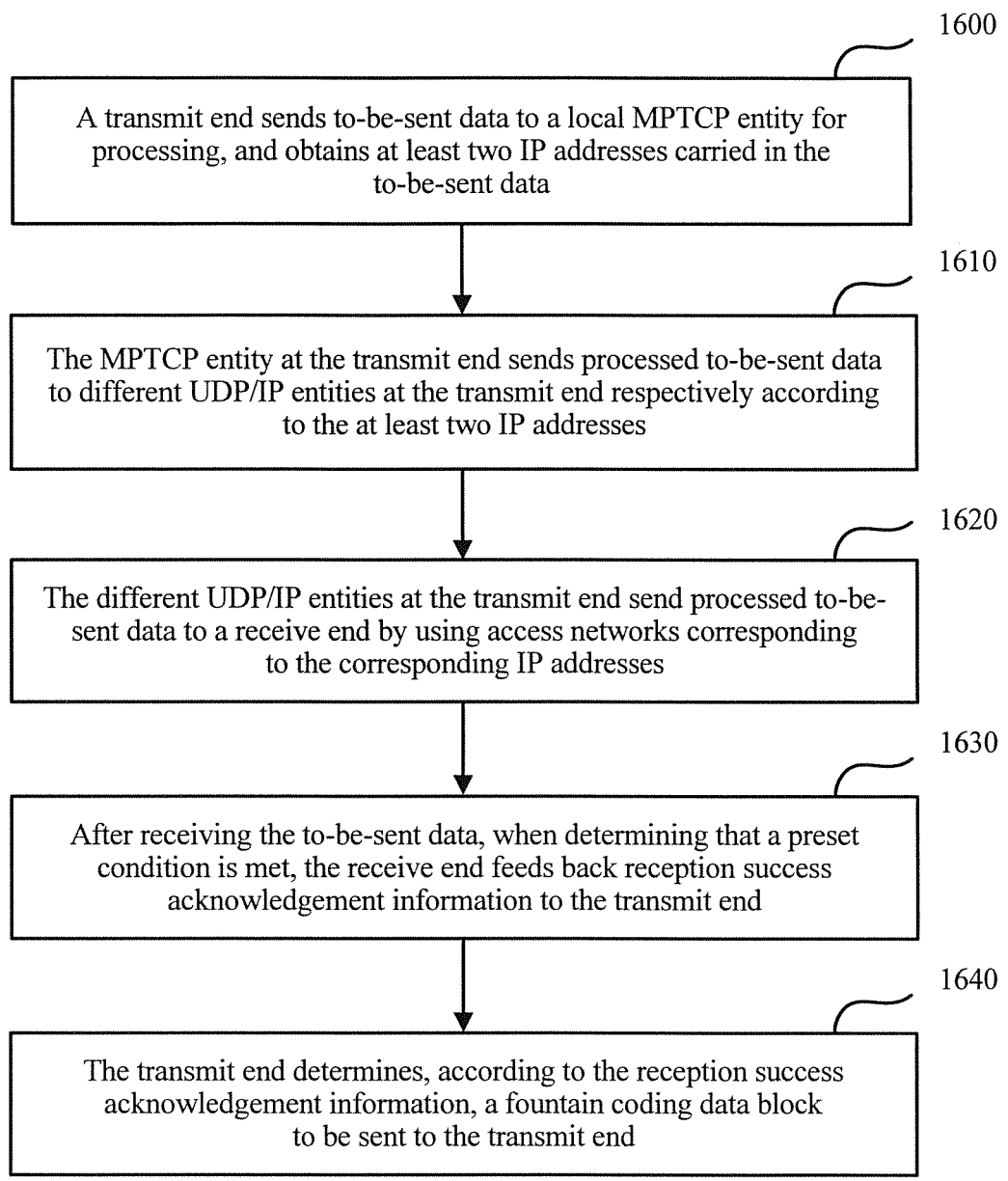
FIG. 16 is a flowchart of data transmission in a specific application scenario according to an embodiment of the present invention.

Based on the foregoing super-flattened wireless communications network, referring to FIG. 16, a procedure in which a fountain coding technology is used to transmit uplink data or downlink data is described in detail by using an example in which an access network in the wireless communications network is an LTE cellular network, and there are at least two IP addresses that UE has.

In this embodiment of the present invention, because a data processing protocol stack of the UE and a data processing protocol stack of an application server are the same, whichever of the UE and the application server is used as a transmit end, a procedure for processing data by the UE and a procedure for processing data by the application server are similar. In the following, a device that sends data is collectively referred to as a transmit end, and a device that receives data is collectively referred to as a receive end to describe a data transmission procedure between the transmit end and the receive end. The UE is a transmit end, and the application server is a receive end, or the application server is a transmit end, and the UE is a receive end.

Step 1600: A transmit end sends to-be-sent data to a local MPTCP entity for processing, and obtains at least two IP addresses carried in the to-be-sent data.

Step 1610: The MPTCP entity at the transmit end sends processed to-be-sent data to different UDP/IP entities at the transmit end respectively according to the at least two IP addresses.

In this embodiment of the present invention, a UDP/IP entity processes data transmitted by using an IP address, and different UDP/IP entities process data transmitted by using different IP addresses.

Step 1620: The different UDP/IP entities at the transmit end send processed to-be-sent data to a receive end by using access networks corresponding to the corresponding IP addresses.

Figure 17:
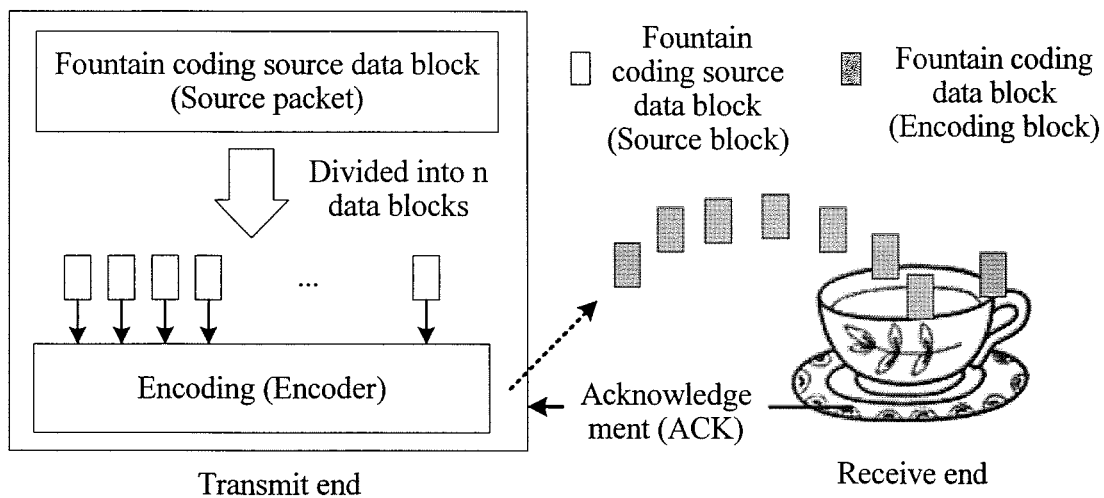
FIG. 17 is a schematic diagram of a principle of a fountain coding technology in a specific application scenario according to an embodiment of the present invention.

In this embodiment of the present invention, the to-be-sent data that is sent to the different UDP/IP entities for processing is fountain coding data blocks. Referring to FIG. 17, the transmit end divides a fountain coding source data block (Source packet) into at least one data block (block), and after encoding the at least one data block, generates a corresponding at least one fountain coding data block (Encoding block), that is, the fountain coding data block is generated by encoding the fountain coding source data block. The transmit end sequentially sends the fountain coding data blocks to the receive end by using all IP addresses corresponding to the transmit end.

Step 1630: After receiving the to-be-sent data, when determining that a preset condition is met, the receive end feeds back reception success acknowledgement information to the transmit end.

In this embodiment of the present invention, the preset condition is that a preset period arrives, or the receive end successfully decodes one or more fountain source data blocks.

In this embodiment of the present invention, the success acknowledgement information is an MPTCP status report used to notify fountain coding data blocks that have been successfully received to the transmit end. The MPTCP status report includes an identity of one or more fountain coding source data blocks and information about whether the one or more fountain coding source data blocks are successfully received, or includes information about how many fountain coding data blocks that have been successfully received separately for one or more fountain coding source data blocks, or includes information about how many fountain coding data blocks that further need to be successfully received separately for one or more fountain coding source data blocks. In addition, the MPTCP status report may further include a number of the last fountain coding source data block (not necessarily correctly decoded) that has been received currently or the number plus 1.

Figure 18:
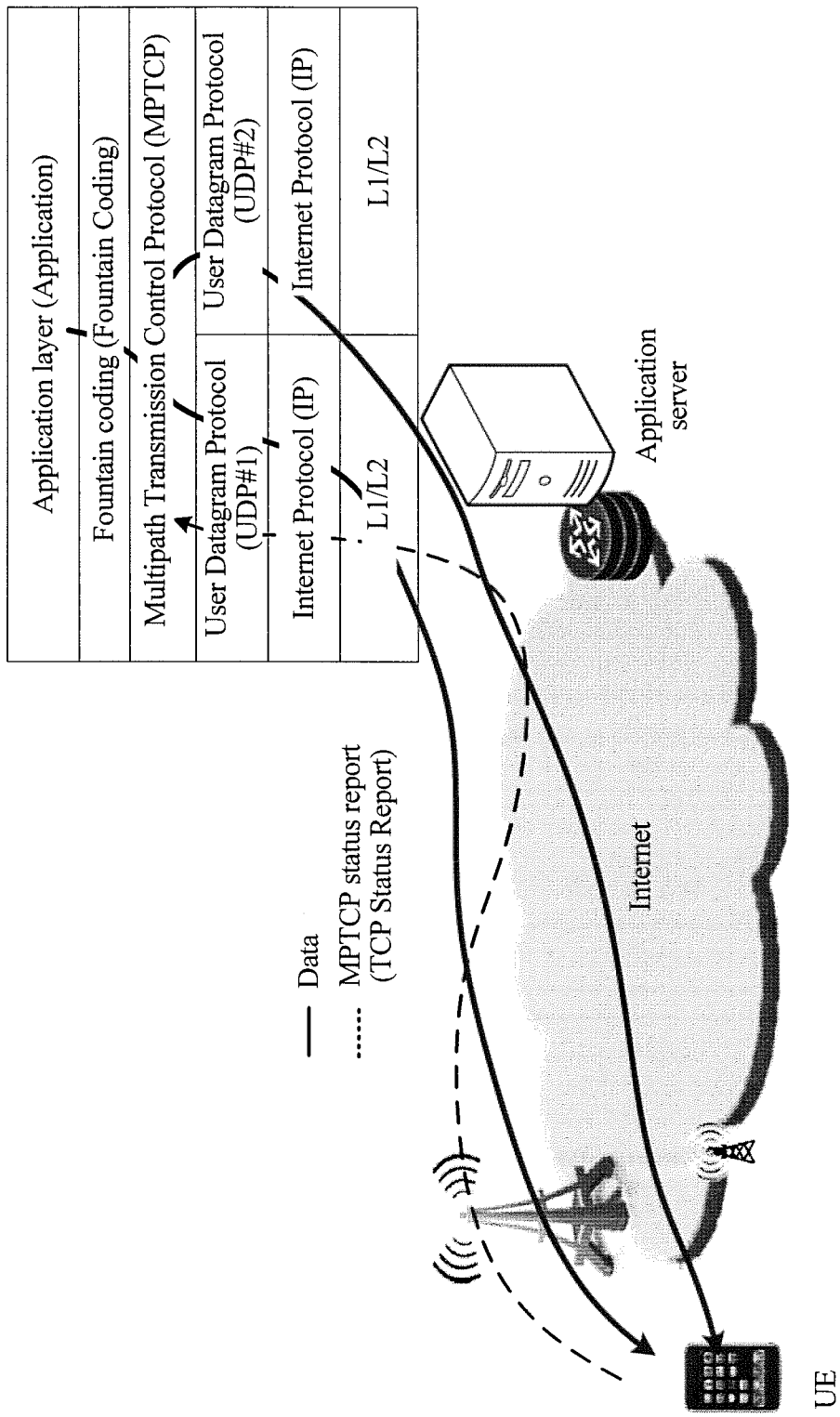
FIG. 18 is a first schematic diagram of data transmission in a wireless communications network in a specific application scenario according to an embodiment of the present invention.

For example, referring to FIG. 18, when the transmit end is the application server, and the receive end is the UE, the application server transmits data (Data) to the UE by using the at least two IP addresses. After the UE receives the data, when it is determined that a preset condition is met, an MPTCP report (TCP Status Report) is sent to the application server.

Step 1640: The transmit end determines, according to the reception success acknowledgement information, a fountain coding data block to be sent to the transmit end.

In this embodiment of the present invention, the transmit end learns, according to the MPTCP status report, information such as fountain coding source data blocks that have been correctly decoded by the receive end, fountain coding source data blocks that are still not correctly decoded, and a transmission success rate of each link corresponding to the transmit end, and determines, according to the information, how many fountain coding data blocks that still need to be transmitted for fountain coding source data blocks that are not correctly received and how many fountain coding data blocks that are distributed on each link corresponding to the transmit end.

Referring to FIG. 19, FIG. 19 is a schematic diagram of an MPTCP status report according to an embodiment of the present invention. In the MPTCP status report, ACK_SN is used to indicate a serial number (SN) of a next fountain coding source data block that is not correctly decoded, where the fountain coding source data block is not reported as a "missing (missing)" state in the MPTCP status report; NACK_SN is used to indicate that a corresponding fountain coding source data block is in a "missing" state, that is, in a TCP reception window, SN is prior to ACK_SN and is an SN of a fountain coding source data block that is not correctly decoded. A "NACK_SN quantity" field may be carried by using an extended bit set in each NACK_SN item, and the extended bit indicates whether there is a NACK_SN item next to the NACK_SN item.

Optionally, before the transmit end transmits the fountain coding data block to the receive end, the receive end sends fountain coding capability supportive information to the transmit end; and receives a fountain code coding/decoding related configuration parameter that is generated by the transmit end according to the fountain coding capability supportive information. The fountain code coding/decoding related configuration parameter includes one or any combination of the following: information such as a quantity of fountain coding data blocks included in one fountain coding source data block, a size of storage space occupied by one fountain coding data block, a period of sending a second MPTCP status report, and a trigger condition of the second MPTCP status report. The fountain coding capability supportive information of the application server includes: whether the application server has a capability of generating a fountain coding data block, and whether the application server has a capability of decoding a fountain coding data block.

Optionally, if a speed of transmitting to-be-sent data on any link corresponding to the transmit end is less than a preset threshold, the MPTCP entity at the transmit end stops distributing to-be-sent data to the any link or reduces to-be-sent data distributed to the any link for transmission, and distributes more to-be-sent data, for transmission, to any remaining one or more links except the any link in all links corresponding to the transmit end.

Figure 20:
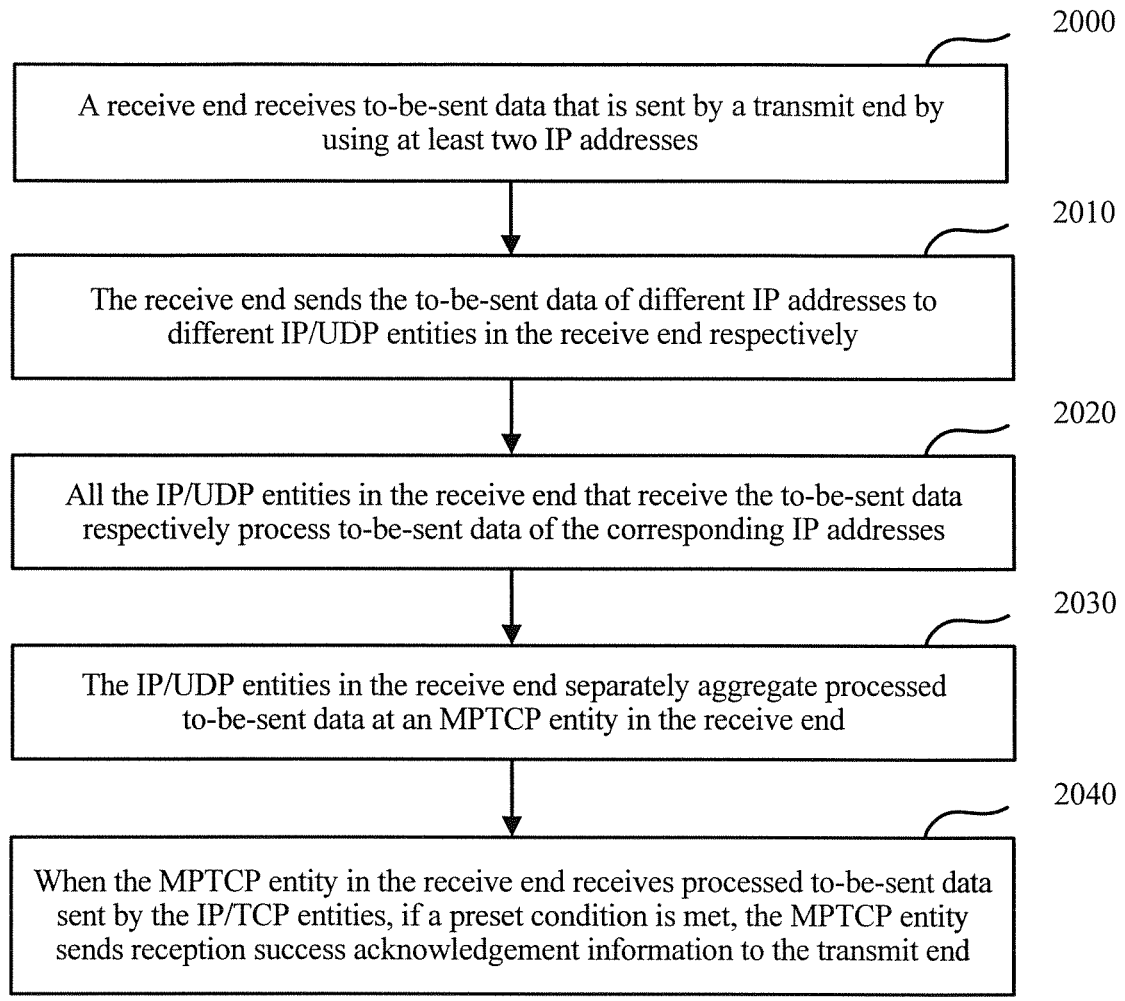
FIG. 20 is a second schematic diagram of data transmission in a wireless communications network in a specific application scenario according to an embodiment of the present invention.

Referring to FIG. 20, a process in which a receive end receives to-be-sent data sent by a transmit end is reverse to a process in which the transmit end sends to-be-sent data, and a specific procedure is as follows:

Step 2000: The receive end receives to-be-sent data that is sent by the transmit end by using at least two IP addresses.

Step 2010: The receive end sends the to-be-sent data of different IP addresses to different IP/UDP entities in the receive end respectively.

In this embodiment of the present invention, one IP/UDP entity is corresponding to one IP address.

Step 2020: All the IP/UDP entities in the receive end that receive the to-be-sent data respectively process to-be-sent data of the corresponding IP addresses.

Step 2030: The IP/UDP entities in the receive end separately aggregate processed to-be-sent data at an MPTCP entity in the receive end.

Step 2040: When the MPTCP entity in the receive end receives processed to-be-sent data sent by the IP/TCP entities, if a preset condition is met, the MPTCP entity sends reception success acknowledgement information to the transmit end.

By using the technical solution, a protocol stack of a transmit end and a protocol stack of a receive end are separately modified. After successfully decoding at least one fountain coding source data, the receive end sends reception success acknowledgement information to the transmit end, so as to avoid a problem, caused by a congestion control mechanism of a TCP layer when a highest protocol layer of all branches in the existing receive end is the TCP layer, that TCP ACK feedback needs to be performed each time a data packet is successfully transmitted, effectively improve a throughput of a wireless communications network, improve an overall transmission rate, and effectively reduce energy consumption of the transmit end. In addition, when a fountain coding technology is used to transmit data, a fountain coding data block may be distributed from a link with a relatively low transmission speed to a link with a relatively high transmission speed, and there is neither a need to retransmit, on the link to which the data block is distributed, data that is successfully transmitted on the link from which the data block is distributed, nor a need to retransmit, on the link to which the data block is distributed, data that is unsuccessfully transmitted on the link from which the data block is distributed, so as to greatly reduce complexity of processing data by the transmit end during distribution between links.

Figure 21:
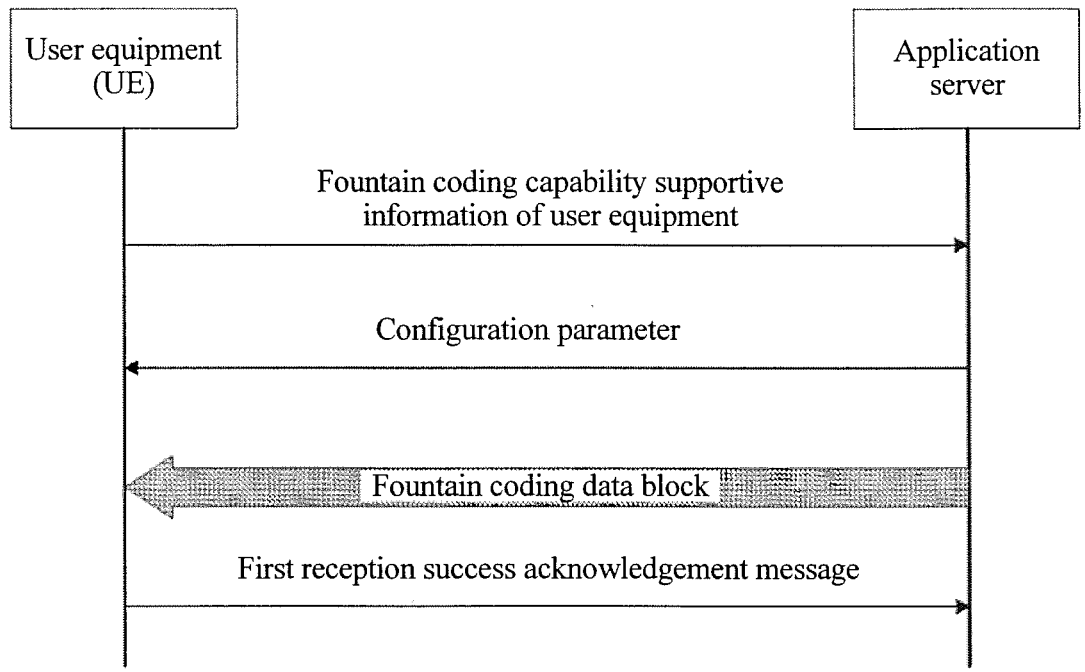
FIG. 21 is a first schematic diagram of signaling interaction of data transmission in a specific application scenario according to an embodiment of the present invention.

Referring to FIG. 21, by using an example in which UE is a receive end, and an application server is a transmit end, in a process of transmitting a fountain coding data block, a process of signaling interaction between the UE and the application server is as follows:

Step 2100: The UE sends fountain coding capability supportive information of the user equipment to the application server.

Step 2110: The application server generates a fountain code coding/decoding related configuration parameter of the user equipment according to the fountain coding capability supportive information of the user equipment, and sends the fountain code coding/decoding related configuration parameter to the UE.

In this embodiment of the present invention, the fountain code coding/decoding related configuration parameter of the user equipment includes one or any combination of the following: information such as a quantity of fountain coding data blocks included in one fountain coding source data block, a size of storage space occupied by one fountain coding data block, a period of sending a second MPTCP status report, and a trigger condition of the second MPTCP status report. The fountain coding capability supportive information of the application server includes: whether the application server has a capability of generating a fountain coding data block, and whether the application server has a capability of decoding a fountain coding data block.

Step 2120: The application server sends a fountain coding data block to the UE.

Step 2130: When a preset condition of the user equipment is met, the UE sends a first reception success acknowledgement message to the application server.

In this embodiment of the present invention, the first reception success acknowledgement message includes a first MPTCP status report.

Figure 22:
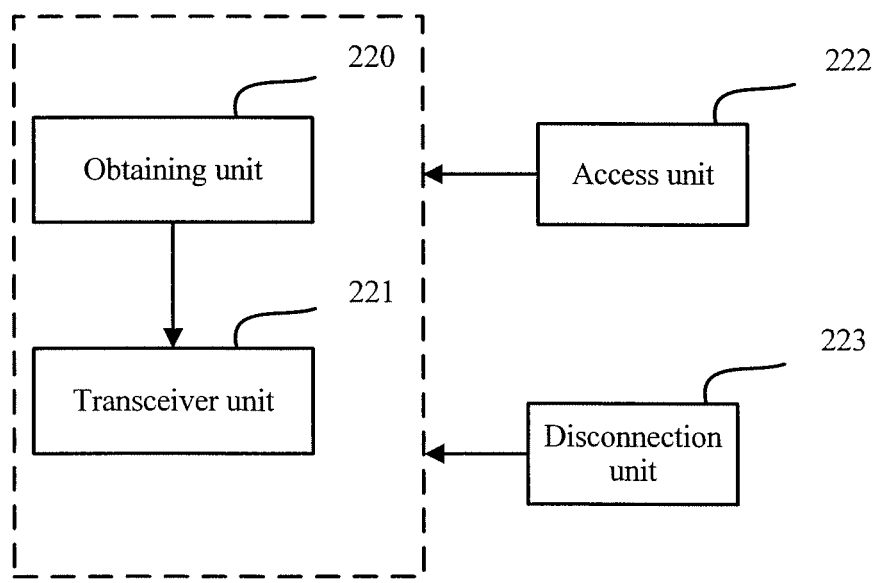
FIG. 22 is a first schematic structural diagram of user equipment according to an embodiment of the present invention.

Based on the technical solution, referring to FIG. 22, the present invention provides user equipment, including an obtaining unit 220 and a transceiver unit 221, where:

the obtaining unit 220 is configured to obtain an Internet Protocol IP address that is allocated by an access network device to the user equipment; and the transceiver unit 221 is configured to: notify the IP address obtained by the obtaining unit 220 to an application server, and receive a data transmission service provided by the application server by using the IP address, where the application server is a server configured to manage mobility of a terminal and service quality.

Optionally, the transceiver unit 220 is further configured to: when notifying the IP address to the application server, notify a user identity to the application server, so that the application server verifies, according to the user identity, whether a user is valid.

Further, the user equipment further includes: an access unit 222, configured to: after accessing an access network corresponding to the access network device, if it is detected, according to a preset rule, that at least one other accessible access network is available, request to access the at least one other access network, where the other access network is a cellular network or a non-cellular network.

Optionally, the obtaining unit 220 is further configured to: after the at least one other access network is accessed, obtain an IP address corresponding to the at least one other access network.

Optionally, the transceiver unit 221 is further configured to notify the IP address corresponding to the at least one other access network to the application server.

Further, the user equipment further includes: a disconnection unit 223, configured to: when the user equipment determines that any IP address is in a no-longer-being-used state, disconnect from an access network corresponding to the IP address.

Optionally, the transceiver unit 221 is further configured to notify, to the application server, the IP address and information about disconnecting from the access network corresponding to the IP address, so that the application server no longer uses the IP address to provide a data transmission service for the user equipment.

Optionally, the transceiver unit 221 is further configured to: after the user equipment disconnects from all access networks corresponding to the user equipment, receive a tracking area identity broadcast by an access network device in at least one access network, and notify the received tracking area identity to the application server, so that the application server determines corresponding one or more access network device identities according to the tracking area identity when the user equipment is paged.

Optionally, the transceiver unit 221 is specifically configured to: when there are at least two IP addresses corresponding to the user equipment, receive the data transmission service provided by the application server by separately using the at least two IP addresses.

Optionally, when the data transmission service is a downlink data transmission service, the transceiver unit 221 is specifically configured to receive downlink data that is sent by the application server by using the at least two IP addresses as different destination IP addresses respectively.

Optionally, the transceiver unit 221 is further configured to: send the downlink data of the different destination IP addresses to different IP/User Datagram Protocol UDP entities in the user equipment respectively, where one IP/UDP entity is corresponding to one destination IP address; aggregate, at a Multipath Transmission Control Protocol MPTCP entity in the user equipment, the downlink data respectively processed by the IP/UDP entities; and when a preset condition of the user equipment is met, control the MPTCP entity to generate first reception success acknowledgement information, and send the first reception success acknowledgement information to the application server.

Optionally, the transceiver unit 221 is specifically configured to aggregate, at the MPTCP entity in the user equipment, fountain coding data blocks processed by the IP/UDP entities.

Optionally, the transceiver unit 221 is further configured to: when it is determined that one or more fountain coding source data blocks are successfully obtained by means of decoding, generate a first MPTCP status report and send the first MPTCP status report to the application server; or send a first MPTCP status report to the application server when a preset period arrives, where the first MPTCP status report includes an identity of one or more fountain coding source data blocks and information about whether reception is successful, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, when the data transmission service is an uplink data transmission service, the transceiver unit 221 is specifically configured to: send the uplink data to an MPTCP entity in the user equipment for processing; control the MPTCP entity to send processed uplink data to different UDP/IP entities respectively for processing; and control the different UDP/IP entities to send processed uplink data to the application server by respectively using access networks corresponding to the at least two IP addresses.

Optionally, the transceiver unit 221 is further configured to receive second reception success acknowledgement information sent by an MPTCP entity in the application server.

Optionally, the uplink data that is sent by the transceiver unit 221 to the different UDP/IP entities for processing is fountain coding data blocks.

Optionally, the transceiver unit 221 is specifically configured to receive a second MPTCP status report sent by the MPTCP entity in the application server, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, the transceiver unit 221 is further configured to: before the fountain coding data block is transmitted, send fountain coding capability supportive information of the user equipment to the application server, and receive a fountain code coding/decoding related configuration parameter of the user equipment that is generated by the application server according to the fountain coding capability supportive information of the user equipment and is used to transmit the fountain coding data block.

The data transmission service received by the transceiver unit 221 includes receiving downlink data and transmitting uplink data.

Figure 23:
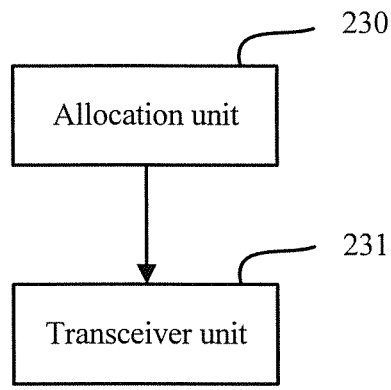
FIG. 23 is a first schematic structural diagram of an access network device according to an embodiment of the present invention.

Based on the technical solution, referring to FIG. 23, an access network device is further provided, and includes an allocation unit 230 and a transceiver unit 231, where:

the allocation unit 230 is configured to: after it is determined that user equipment gains access locally, allocate an Internet Protocol IP address to the user equipment; and the transceiver unit 231 is configured to send, to the user equipment, the IP address allocated by the allocation unit 230 to the user equipment, so that the user equipment sends the IP address to an application server, and receives a data transmission service provided by the application server by using the IP address, where the application server is a server configured to manage mobility of a terminal and service quality.

Optionally, the transceiver unit 231 is further configured to: before the IP address is allocated to the user equipment, send a request message to the application server, where the request message is used to request the application server to perform a communication initialization process with the access network device, and receive a response message that is generated by the application server according to the request message, where the response message is used to determine that communication initialization between the access network device and the application server is completed.

Figure 24:
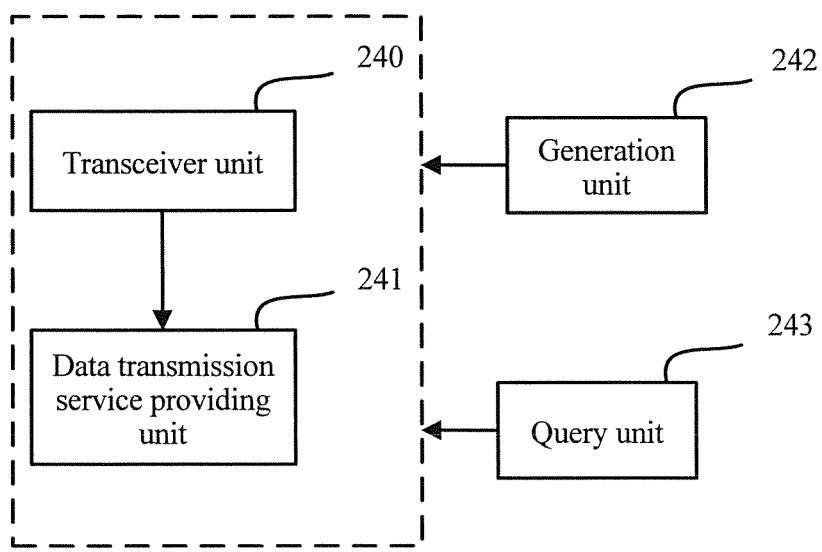
FIG. 24 is a schematic structural diagram of an application server according to an embodiment of the present invention.

Based on the technical solution, referring to FIG. 24, an application server is further provided, and includes a transceiver unit 240 and a data transmission service providing unit 241, where:

the transceiver unit 240 is configured to receive an Internet Protocol IP address sent by user equipment, where the IP address is allocated by an access network device; and the data transmission service providing unit 241 is configured to provide a data transmission service for the user equipment by using the IP address that is received by the transceiver unit 240 and that is corresponding to the user equipment, where the application server is a server configured to manage mobility of a terminal and service quality.

Optionally, the transceiver unit 240 is further configured to: before receiving the IP address sent by the user equipment, receive a request message sent by the access network device, where the request message is used to request the application server to perform a communication initialization process with the access network device.

Further, the application server further includes: a generation unit 242, configured to: generate a response message according to the request message received by the transceiver unit 240, and send the response message to the transceiver unit 240, where the response message is used to determine that communication initialization between the access network device and the application server is completed.

Optionally, the transceiver unit 240 is further configured to: receive the response message generated by the generation unit 242, and send the response message to the access network device.

Optionally, the transceiver unit 240 is further configured to: when receiving the IP address sent by the user equipment, receive a user identity sent by the user equipment, and verify, according to the user identity, whether a user corresponding to the user equipment is valid.

Optionally, when the user equipment accesses at least one other accessible access network, and obtains an IP address corresponding to the at least one other access network, the transceiver unit 240 is further configured to receive the IP address that is sent by the user equipment and that is corresponding to the at least one other access network.

Optionally, when there are at least two received IP addresses that are sent by the user equipment, the data transmission service providing unit 241 is specifically configured to provide the data transmission service for the user equipment by separately using the at least two IP addresses.

Optionally, the transceiver unit 240 is further configured to: when any IP address corresponding to the user equipment is in a no-longer-being-used state, receive the IP address and information about disconnecting from an access network corresponding to the IP address that are sent by the user equipment.

Optionally, the data transmission service providing unit 241 is further configured to determine, according to the IP address and the information about disconnecting from the access network corresponding to the IP address that are received by the transceiver unit 240, that the IP address and the access network corresponding to the IP address are not used locally to provide a data transmission service for the user equipment.

Optionally, when the IP address is the last IP address that the user equipment has, the transceiver unit 240 is further configured to: when receiving the IP address and the information about disconnecting from the access network corresponding to the IP address that are sent by the user equipment, receive a tracking area identity that is broadcast by an access network device in at least one access network and is sent by the user equipment.

Further, the application server further includes: a query unit 243, configured to: when it is determined to page the user equipment, query, in a locally stored mapping table according to the tracking area identity received by the transceiver unit 240, one or more access network device identities corresponding to the tracking area identity.

Optionally, when the data transmission service is downlink data transmission, the data transmission service providing unit 241 is specifically configured to: send the downlink data to a local Multipath Transmission Control Protocol MPTCP entity for processing; control the MPTCP entity to send processed downlink data to different User Datagram Protocol UDP/IP entities respectively for processing; and control the different UDP/IP entities to send processed downlink data to the user equipment by respectively using access networks corresponding to the at least two IP addresses.

Optionally, the transceiver unit 240 is further configured to receive first reception success acknowledgement information sent by an MPTCP entity in the user equipment.

Optionally, the downlink data that is sent by the data transmission service providing unit 241 to the different UDP/IP entities for processing is fountain coding data blocks.

Optionally, the transceiver unit 240 is specifically configured to receive a first MPTCP status report sent by the MPTCP entity in the user equipment, where the first MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, when the data transmission service is uplink data transmission, the data transmission service providing unit 241 is specifically configured to: receive uplink data that is sent by the user equipment by using the at least two IP addresses as source IP addresses; send the uplink data of the different source IP addresses to different local IP/UDP entities respectively, where one IP/UDP entity is corresponding to one IP address; aggregate, at a local MPTCP entity, the uplink data respectively processed by the IP/UDP entities; and when a preset condition of the application server is met, control the MPTCP entity to generate second reception success acknowledgement information.

Optionally, the transceiver unit 240 is specifically configured to send, to the user equipment, the second reception success acknowledgement information generated by the data transmission service providing unit.

Optionally, the data transmission service providing unit 241 is further configured to aggregate, at the MPTCP entity, fountain coding data blocks processed by the different IP/UDP entities.

Optionally, the data transmission service providing unit 241 is specifically configured to: when it is determined that one or more fountain coding source data blocks are successfully obtained by means of decoding, generate a second MPTCP status report; or when a preset period arrives, generate a second MPTCP status report, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, the transceiver unit 240 is specifically configured to send, to the user equipment, the second MPTCP status report generated by the data transmission service providing unit.

Optionally, the transceiver unit 240 is further configured to: before the fountain coding data block is transmitted, send fountain coding capability supportive information of the application server to the user equipment, and receive a fountain code coding/decoding related configuration parameter of the application server that is generated by the user equipment according to the fountain coding capability supportive information of the application server and is used to transmit the fountain coding data block.

Figure 25:
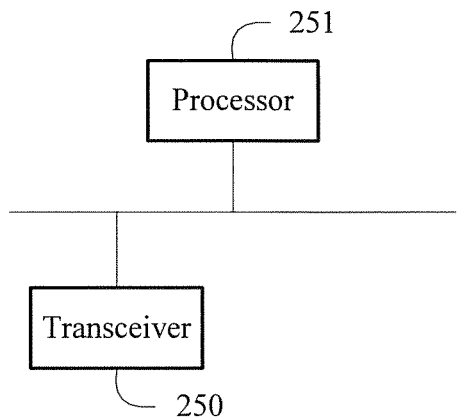
FIG. 25 is a second schematic structural diagram of user equipment according to an embodiment of the present invention.

Based on the technical solution, referring to FIG. 25, user equipment is provided and includes a transceiver 250 and a processor 251, where:

the transceiver 250 is configured to obtain an Internet Protocol IP address that is allocated by an access network device to the user equipment; and the transceiver 250 is further configured to: notify the IP address obtained by the obtaining unit to an application server, and receive a data transmission service provided by the application server by using the IP address, where the application server is a server configured to manage mobility of a terminal and service quality.

Optionally, the transceiver 250 is further configured to: when notifying the IP address to the application server, notify a user identity to the application server, so that the application server verifies, according to the user identity, whether a user is valid.

The processor 251 is configured to: after accessing an access network corresponding to the access network device, if it is detected, according to a preset rule, that at least one other accessible access network is available, request to access the at least one other access network, where the other access network is a cellular network or a non-cellular network.

Optionally, the transceiver 250 is further configured to: after the at least one other access network is accessed, obtain an IP address corresponding to the at least one other access network.

Optionally, the transceiver 250 is further configured to notify the IP address corresponding to the at least one other access network to the application server.

Optionally, the processor 251 is further configured to: when the user equipment determines that any IP address is in a no-longer-being-used state, disconnect from an access network corresponding to the IP address.

Optionally, the transceiver 250 is further configured to notify, to the application server, the IP address and information about disconnecting from the access network corresponding to the IP address, so that the application server no longer uses the IP address to provide a data transmission service for the user equipment.

Optionally, the transceiver 250 is further configured to: after the user equipment disconnects from all access networks corresponding to the user equipment, receive a tracking area identity broadcast by an access network device in at least one access network, and notify the received tracking area identity to the application server, so that the application server determines corresponding one or more access network device identities according to the tracking area identity when the user equipment is paged.

Optionally, the transceiver 250 is specifically configured to: when there are at least two IP addresses corresponding to the user equipment, receive the data transmission service provided by the application server by separately using the at least two IP addresses.

Optionally, when the data transmission service is a downlink data transmission service, the transceiver 250 is specifically configured to receive downlink data that is sent by the application server by using the at least two IP addresses as different destination IP addresses respectively.

Optionally, the transceiver 250 is further configured to: send the downlink data of the different destination IP addresses to different IP/User Datagram Protocol UDP entities in the user equipment respectively, where one IP/UDP entity is corresponding to one destination IP address; aggregate, at a Multipath Transmission Control Protocol MPTCP entity in the user equipment, the downlink data respectively processed by the IP/UDP entities; and when a preset condition of the user equipment is met, control the MPTCP entity to generate first reception success acknowledgement information, and send the first reception success acknowledgement information to the application server.

Optionally, the transceiver 250 is specifically configured to aggregate, at the MPTCP entity in the user equipment, fountain coding data blocks processed by the IP/UDP entities.

Optionally, the transceiver 250 is further configured to: when it is determined that one or more fountain coding source data blocks are successfully obtained by means of decoding, generate a first MPTCP status report and send the first MPTCP status report to the application server; or send a generated first MPTCP status report to the application server according to a preset period, where the first MPTCP status report includes an identity of one or more fountain coding source data blocks and information about whether reception is successful, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, when the data transmission service is an uplink data transmission service, the transceiver 250 is specifically configured to: send the uplink data to an MPTCP entity in the user equipment for processing; control the MPTCP entity to send processed uplink data to different UDP/IP entities respectively for processing; and control the different UDP/IP entities to send processed uplink data to the application server by respectively using access networks corresponding to the at least two IP addresses.

Optionally, the transceiver 250 is further configured to receive second reception success acknowledgement information sent by an MPTCP entity in the application server.

Optionally, the uplink data that is sent by the transceiver 250 to the different UDP/IP entities for processing is fountain coding data blocks.

Optionally, the transceiver 250 is specifically configured to receive a second MPTCP status report sent by the MPTCP entity in the application server, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, the transceiver 250 is further configured to: before the fountain coding data block is transmitted, send fountain coding capability supportive information of the user equipment to the application server, and receive a fountain code coding/decoding related configuration parameter of the user equipment that is generated by the application server according to the fountain coding capability supportive information of the user equipment and is used to transmit the fountain coding data block.

Figure 26:
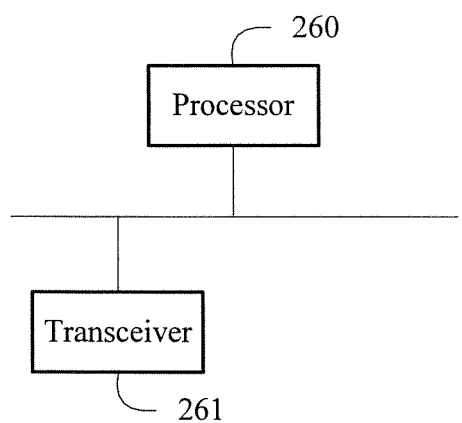
FIG. 26 is a second schematic structural diagram of an access network device according to an embodiment of the present invention.

Based on the technical solution, referring to FIG. 26, an embodiment of the present invention further provides an access network device, including a processor 260 and a transceiver 261, where:

the processor 260 is configured to: after it is determined that user equipment gains access locally, allocate an Internet Protocol IP address to the user equipment; and the transceiver 261 is configured to send, to the user equipment, the IP address allocated by the processor 260 to the user equipment, so that the user equipment sends the IP address to an application server, and receives a data transmission service provided by the application server by using the IP address, where the application server is a server configured to manage mobility of a terminal and service quality.

Optionally, the transceiver 261 is further configured to: before the IP address is allocated to the user equipment, send a request message to the application server, where the request message is used to request the application server to perform a communication initialization process with the access network device, and receive a response message that is generated by the application server according to the request message, where the response message is used to determine that communication initialization between the access network device and the application server is completed.

Figure 27:
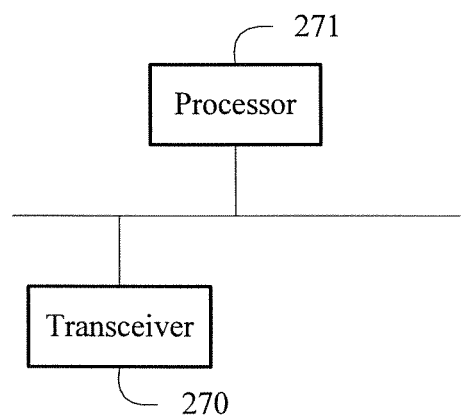
FIG. 27 is a schematic structural diagram of an application server device according to an embodiment of the present invention.

Based on the technical solution, referring to FIG. 27, an embodiment of the present invention further provides an application server, including a transceiver 270 and a processor 271, where:

the transceiver 270 is configured to receive an Internet Protocol IP address sent by user equipment, where the IP address is allocated by an access network device; and the processor 271 is configured to provide a data transmission service for the user equipment by using the IP address that is received by the transceiver 270 and that is corresponding to the user equipment, where the application server is a server configured to manage mobility of a terminal and service quality.

Optionally, the transceiver 270 is further configured to: before receiving the IP address sent by the user equipment, receive a request message sent by the access network device, where the request message is used to request the application server to perform a communication initialization process with the access network device.

Optionally, the processor 271 is further configured to: generate a response message according to the request message received by the transceiver 270, and send the response message to the transceiver 270, where the response message is used to determine that communication initialization between the access network device and the application server is completed.

Optionally, the transceiver 270 is further configured to: receive the response message generated by the processor 271, and send the response message to the access network device.

Optionally, the transceiver 270 is further configured to: when receiving the IP address sent by the user equipment, receive a user identity sent by the user equipment, and verify, according to the user identity, whether a user corresponding to the user equipment is valid.

Optionally, when the user equipment accesses at least one other accessible access network, and obtains an IP address corresponding to the at least one other access network, the transceiver 270 is further configured to receive the IP address that is sent by the user equipment and that is corresponding to the at least one other access network.

Optionally, when there are at least two received IP addresses that are sent by the user equipment and are received by the application server, the processor 271 is specifically configured to provide the data transmission service for the user equipment by separately using the at least two IP addresses.

Optionally, the transceiver 270 is further configured to: when any IP address corresponding to the user equipment is in a no-longer-being-used state, receive the IP address and information about disconnecting from an access network corresponding to the IP address that are sent by the user equipment.

Optionally, the processor 271 is further configured to determine, according to the IP address and the information about disconnecting from the access network corresponding to the IP address, that the IP address and the access network corresponding to the IP address are not used locally to provide a data transmission service for the user equipment, where the IP address and the information about disconnecting from the access network corresponding to the IP address are received by the transceiver 270.

Optionally, when the IP address is the last IP address that the user equipment has, the transceiver 270 is further configured to: when receiving the IP address and the information about disconnecting from the access network corresponding to the IP address that are sent by the user equipment, receive a tracking area identity that is broadcast by an access network device in at least one access network and is sent by the user equipment.

Optionally, the processor 271 is further configured to: when it is determined to page the user equipment, query, in a locally stored mapping table according to the tracking area identity received by the transceiver 270, one or more access network device identities corresponding to the tracking area identity.

Optionally, when the data transmission service is downlink data transmission, the processor 271 is specifically configured to: send the downlink data to a local Multipath Transmission Control Protocol MPTCP entity for processing; control the MPTCP entity to send processed downlink data to different User Datagram Protocol UDP/IP entities respectively for processing; and control the different UDP/IP entities to send processed downlink data to the user equipment by respectively using access networks corresponding to the at least two IP addresses.

Optionally, the transceiver 270 is further configured to receive first reception success acknowledgement information sent by an MPTCP entity in the user equipment.

Optionally, the downlink data that is sent by the transceiver 270 to the different UDP/IP entities for processing is fountain coding data blocks.

Optionally, the transceiver 270 is specifically configured to receive a first MPTCP status report sent by the MPTCP entity in the user equipment, where the first MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, when the data transmission service is uplink data transmission, the processor 271 is specifically configured to: receive uplink data that is sent by the user equipment by using the at least two IP addresses as source IP addresses; send the uplink data of the different source IP addresses to different local IP/UDP entities respectively, where one IP/UDP entity is corresponding to one IP address; aggregate, at a local MPTCP entity, the uplink data respectively processed by the IP/UDP entities; and when a preset condition of the application server is met, control the MPTCP entity to generate second reception success acknowledgement information.

Optionally, the transceiver 270 is specifically configured to send, to the user equipment, the second reception success acknowledgement information generated by the processor 271.

Optionally, the processor 271 is further configured to aggregate, at the MPTCP entity, fountain coding data blocks processed by the different IP/UDP entities.

Optionally, the processor 271 is specifically configured to: when it is determined that one or more fountain coding source data blocks are successfully obtained by means of decoding, generate a second MPTCP status report; or when a preset period arrives, generate a second MPTCP status report, where the second MPTCP status report includes an identity of one or more fountain coding source data blocks and information about whether the one or more fountain coding source data blocks are successfully received, or includes a quantity of fountain coding data blocks that have been successfully received for each fountain coding source data block, or includes a quantity of fountain coding data blocks that further need to be successfully received for each fountain coding source data block, and the fountain coding data block is generated by encoding the fountain coding source data block.

Optionally, the transceiver 270 is specifically configured to send, to the user equipment, the second MPTCP status report generated by the processor 271.

Optionally, the transceiver 270 is further configured to: before the fountain coding data block is transmitted, send fountain coding capability supportive information of the application server to the user equipment, and receive a fountain code coding/decoding related configuration parameter of the application server that is generated by the user equipment according to the fountain coding capability supportive information of the application server and is used to transmit the fountain coding data block.

In conclusion, in the embodiments of the present invention, user equipment obtains an IP address allocated by an access network device, and sends the allocated IP address to an application server, and the user equipment receives a data transmission service provided by the application server by using the IP address. By using the technical solutions of the present invention, a PDN-GW, an SGW, a PCRF entity, an MME, and an HSS in an existing wireless communications network are deleted, and functions of the foregoing network side devices are implemented by using the access network device and the application server. Therefore, it is avoided that an SGW-to-PDN-GW link becomes a bottleneck of a processing capability of the wireless communications network, network layers are greatly reduced, a data transmission delay is effectively reduced, and a network paralysis risk is reduced.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A user equipment, comprising:
a processor configured to obtain an Internet Protocol (IP) address allocated by an access network device to the user equipment; and
a transceiver, configured to:
notify the IP address to an application server,
receive a data transmission service provided by the application server using the IP address, wherein the application server is a server that manages mobility of a terminal and service quality;
after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;

when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

2. The user equipment according to claim 1, wherein the transceiver is further configured to:
when notifying the IP address to the application server, notify a user identity to the application server for enabling the application server to verify, according to the user identity, whether a user is valid.

3. An access network device, comprising:
a processor configured to:
determine that a user equipment has gained access to a network;
after determining that the user equipment has gained access to the network, allocate an Internet Protocol (IP) address to the user equipment; and
a transceiver, configured to send the IP address to the user equipment for enabling the user equipment to send the IP address to an application server and to receive a data transmission service provided by the application server using the IP address, wherein the application server is a server configured to manage mobility of a terminal and a service quality;
wherein, after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;
when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

4. An application server, comprising:
a transceiver unit, configured to receive an Internet Protocol (IP) address sent by user equipment, wherein the IP address is allocated by an access network device; and
a data transmission service providing unit, configured to provide a data transmission service for the user equipment by using the IP address received by the transceiver unit and that is corresponding to the user equipment;
wherein, after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;
when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

5. The application server according to claim 4, wherein the transceiver is further configured to:
when receiving the IP address sent by the user equipment, receive a user identity sent by the user equipment, and verify, according to the user identity, whether a user corresponding to the user equipment is valid.

6. The application server according to claim 5, wherein when the user equipment accesses at least one other accessible access network, and obtains an IP address corresponding to the at least one other access network, the transceiver is further configured to:
receive the IP address that is sent by the user equipment and corresponds to the at least one other access network.

7. A method for performing communication, the method comprising:

obtaining, by a user equipment, an Internet Protocol (IP) address that is allocated by an access network device to the user equipment;

notifying, by the user equipment, the IP address to an application server, wherein the application server is a server configured to manage mobility of a terminal and a service quality;

receiving, by the user equipment, a data transmission service provided by the application server using the IP address;

after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;

when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

8. The method according to claim 7, wherein when the user equipment notifies the IP address to the application server, the method further comprises:

notifying, by the user equipment, a user identity to the application server for enabling the application server to verify, according to the user identity, whether a user is valid.

9. A method for communication, the method comprising:

determining, by an access network device, that a user equipment has gained access to a network;

after determining that the user equipment has gained access to the network, allocating, by the access network device, an Internet Protocol (IP) address to the user equipment;

sending, by the access network device, the IP address to the user equipment for enabling the user equipment to send the IP address to an application server and to receive a data transmission service provided by the application server using the IP address, wherein the application server is a server configured to manage mobility of a terminal and a service quality;

after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;

when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

10. A method for communication, the method comprising:

receiving, by an application server, an Internet Protocol (IP) address sent by user equipment, wherein the IP address is allocated by an access network device; and providing, by the application server, a data transmission service for the user equipment using the IP address, wherein the application server is a server that manages mobility of a terminal and a server quality;

after accessing an access network corresponding to the access network device, an availability of at least one other accessible access network is detected according to a preset rule, requesting, by the user equipment, to access the at least one other access network, wherein the at least one other access network is a cellular network or a non-cellular network, wherein after the user equipment accesses the at least one other access network: obtaining, by the user equipment an IP address corresponding to the at least one other access network; and notifying, by the user equipment the IP address corresponding to the at least one other access network to the application server;

when determining that any IP address is in a no-longer-being-used state, disconnecting, by the user equipment, from an access network corresponding to the IP address, and, notifying, by the user equipment and to the application server, the IP address and information about disconnecting from the access network corresponding to the IP address for enabling the application server to no longer use the IP address to provide a data transmission service for the user equipment; and after disconnecting from all access networks corresponding to the user equipment, receiving, by the user equipment, a tracking area identity broadcast by an access network device in at least one access network, and notifying, by the user equipment, the tracking area identity to the application server for enabling the application server to determine one or more corresponding access network device identities according to the tracking area identity when the user equipment is paged.

11. The method according to claim 10, wherein when the application server receives the IP address sent by the user equipment, the method further comprises:
- receiving, by the application server, a user identity sent by the user equipment, and
- verifying, by the application server and according to the user identity, whether a user corresponding to the user equipment is valid.

12. The method according to claim 11, wherein when the user equipment accesses at least one other accessible access network, and obtains an IP address corresponding to the at least one other access network, the method further comprises:
- receiving, by the application server, the IP address sent by the user equipment and that is corresponding to the at least one other access network.

13. The method according to claim 12, further comprising:
- when any IP address corresponding to the user equipment is in a no-longer-being-used state, receiving, by the application server, the IP address and information about disconnecting from an access network corresponding to the IP address that are sent by the user equipment; and
- determining, by the application server, that the IP address and the access network corresponding to the IP address are not used locally to provide a data transmission service for the user equipment.

\* \* \* \* \*